US012203328B2

(12) United States Patent
Fox

(10) Patent No.: US 12,203,328 B2
(45) Date of Patent: Jan. 21, 2025

(54) DOWNHOLE INDUCTIVE TRANSMISSION COUPLER WITH NONLINEAR COIL

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 535 days.

(21) Appl. No.: 17/579,898

(22) Filed: Jan. 20, 2022

(65) Prior Publication Data

US 2022/0145707 A1 May 12, 2022

(51) Int. Cl.

| | |
|---|---|
| ***E21B 17/02*** | (2006.01) |
| ***E21B 47/13*** | (2012.01) |
| ***H01F 27/02*** | (2006.01) |
| ***H01F 27/24*** | (2006.01) |
| ***H01F 27/28*** | (2006.01) |
| ***H01F 27/34*** | (2006.01) |

(52) U.S. Cl.

CPC .......... *E21B 17/0283* (2020.05); *E21B 47/13* (2020.05); *H01F 27/02* (2013.01); *H01F 27/24* (2013.01); *H01F 27/2823* (2013.01); *H01F 27/34* (2013.01); *H01F 2027/2838* (2013.01)

(58) Field of Classification Search

CPC ...... E21B 17/0283; E21B 47/13; H01F 27/02; H01F 27/24; H01F 27/2823; H01F 27/34; H01F 2027/2838; H01F 27/366; H01F 38/14

See application file for complete search history.

(56) References Cited

U.S. PATENT DOCUMENTS

2002/0116883 A1* 8/2002 Cole ...................... H02G 3/185 52/220.8
2005/0285752 A1* 12/2005 Hall ...................... E21B 17/028 340/854.8
2008/0055176 A1* 3/2008 Bae .......................... H01Q 1/38 343/792.5
2008/0060985 A1* 3/2008 Carew .................. B01D 29/925 210/497.1
2011/0304328 A1* 12/2011 Yamamoto ......... G01N 27/9006 324/240
2013/0000399 A1* 1/2013 Lilly ..................... E21B 47/017 73/152.58
2014/0140655 A1* 5/2014 Chakravarty ...... G01N 21/7746 385/12
2016/0237760 A1* 8/2016 Wall ...................... E21B 17/003
2017/0184753 A1* 6/2017 Prakash ................... G01V 3/28
2018/0290423 A1* 10/2018 Twelves, Jr. .............. B32B 7/12
2020/0202118 A1* 6/2020 Teoh .................... G06V 40/103

* cited by examiner

*Primary Examiner* — Amine Benlagsir

(57) ABSTRACT

A transmission element for a downhole tool comprising an annular housing and an annular ferrite channel within the annular housing. An annular nonlinear coil may be disposed within the annular ferrite channel, and the nonlinear coil may be connected to a cable running within the downhole tool. The housing may be an annular groove or recess within the tool, an annular metal trough, or an annular polymeric block. The polymeric block may comprise a composite of a polymer and a volume of ferrite elements comprising Fe and Mn. The annular nonlinear coil may comprise a wave, a helix, a twisted pair of wires, a transformer comprising a coil and a metal core, or a combination thereof. The polymeric block may comprise and bumper on its periphery and a void opening within the block proximate the bumper. The ferrite channel and the coil may be molded within the polymeric block.

20 Claims, 18 Drawing Sheets

(Prior Art) FIG. 6

(Prior Art) FIG. 7

(Prior Art) FIG. 8

(Prior Art) FIG. 9

(Prior Art) FIG. 10

(Prior Art) FIG. 11

(Prior Art) FIG. 12

(Prior Art) FIG. 13

(Prior Art) FIG. 14

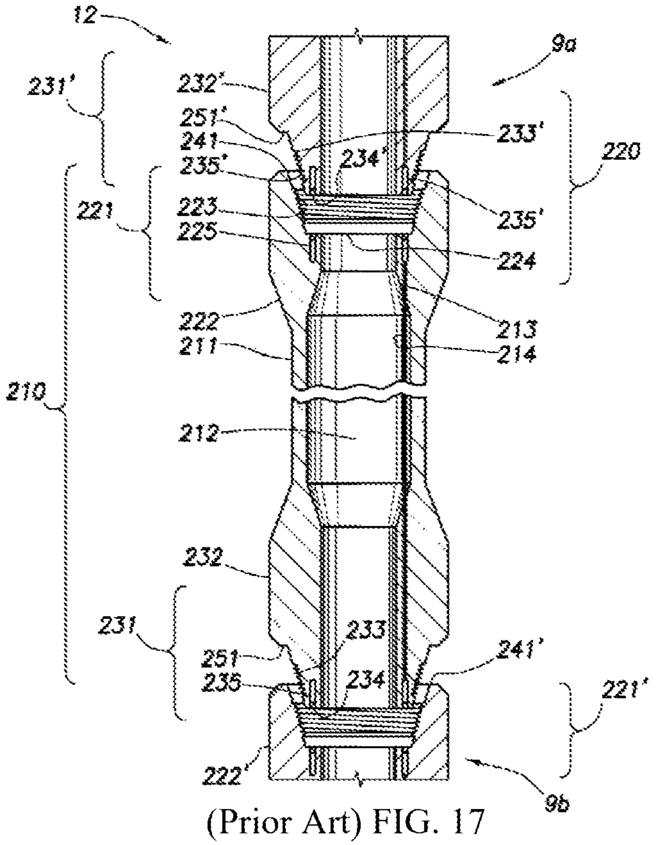
(Prior Art) FIG. 17
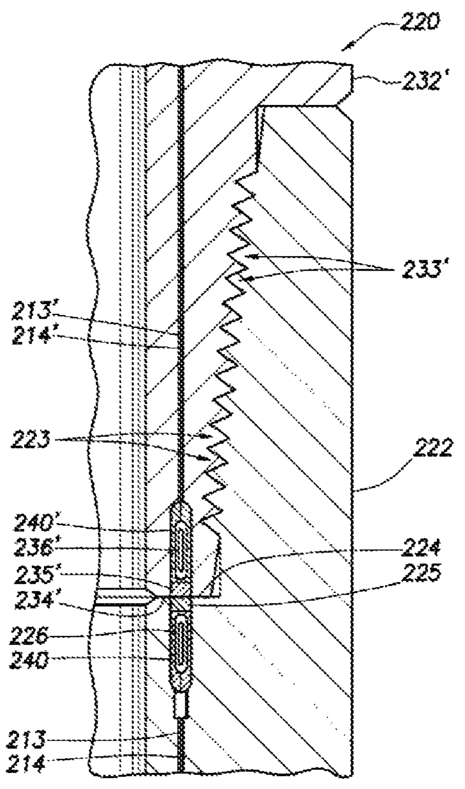
(Prior Art) FIG. 18

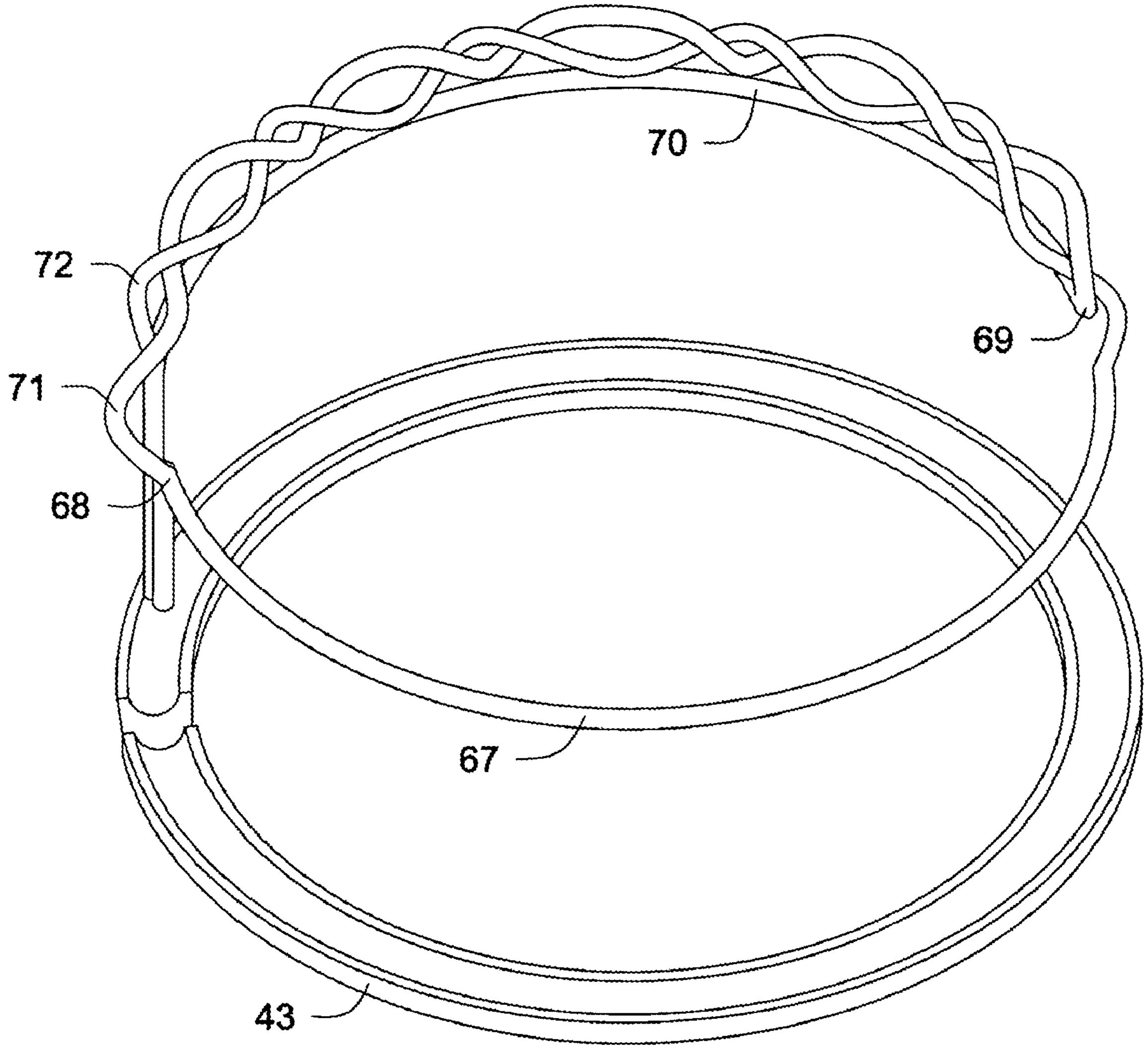
(Prior Art) FIG. 19

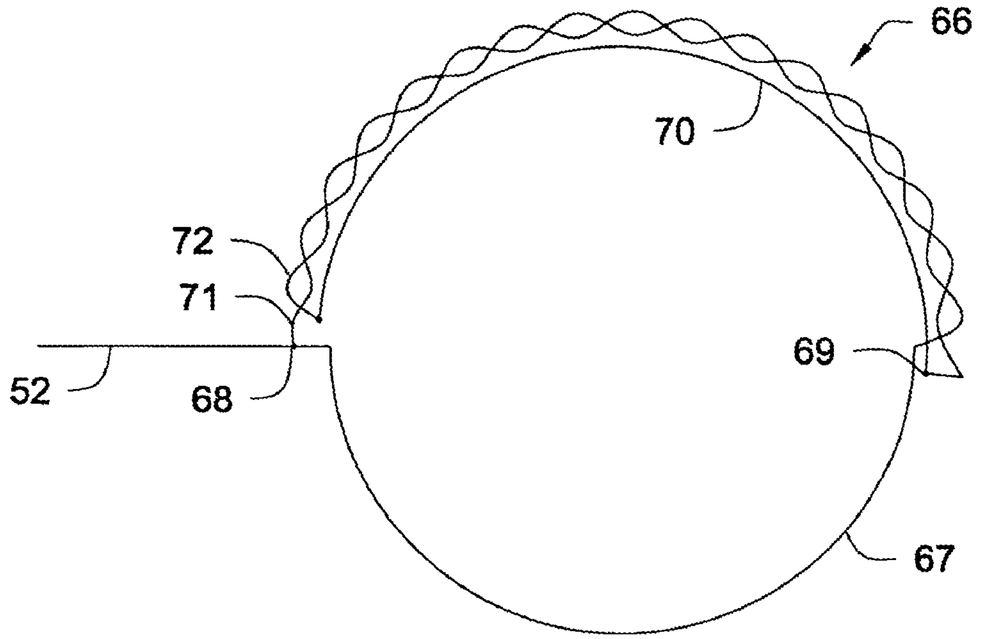
(Prior Art) FIG. 20
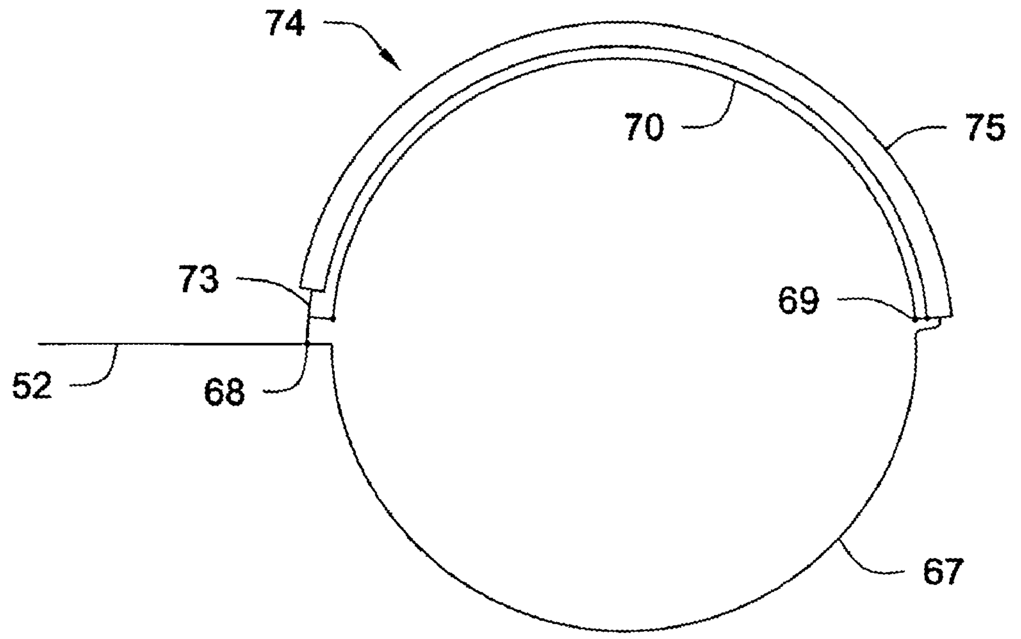
(Prior Art) FIG. 21

DOWNHOLE INDUCTIVE TRANSMISSION COUPLER WITH NONLINEAR COIL

CROSS REFERENCE TO RELATED APPLICATIONS

This application is a modification and alteration of U.S. Pat. No. 7,139,218, to Hall et al., issued Nov. 21, 2006, entitled Distributed Downhole Drilling Network, which is incorporated herein by this reference.

Further, U.S. Pat. No. 11,033,958, to Imaoka et al., issued Jun. 15, 2021, entitled Magnetic Material and Manufacturing Method Therefor, is incorporated herein by this reference.

Further, prior art FIG. 14 is taken from U.S. Pat. No. 7,040,003 to Hall et al., issued May 9, 2006, Entitled Inductive Coupler For Downhole Components And Methods For Making Same, which is incorporated herein by this reference.

Further, prior art FIGS. 15-18 are taken from U.S. Pat. No. 9,121,962 to Madhavan et al., issued Sep. 1, 2015, entitled Method and Conduit for Transmitting Signals which is incorporated herein by this reference.

Finally, prior art FIGS. 19-21 are taken from U.S. Pat. No. 7,248,177 to Hall et al., issued Jul. 24, 2007, entitled Down Hole Transmission System which is incorporated herein by this reference.

BACKGROUND OF INVENTION

This invention relates to apparatus and methods providing a downhole network for transmitting information along a drillstring and between downhole drilling components, and from downhole drilling components along the drillstring to the ground's surface.

SUMMARY OF INVENTION

A transmission system that may be used for transmitting data and power in a downhole environment comprises an annular housing and an annular ferrite channel within the annular housing. The ferrite channel may comprise electrically insulating and magnetically conductive materials. The ferrite channel may comprise a plurality of ferrite segments closely aligned end for end or it may be a single, continuous ferrite channel without interruptions. An annular nonlinear electrically conductive coil may be disposed within a core region of the annular ferrite channel. The core region may be substantially noncircular having a major and minor diameter. An end of the annular nonlinear electrically conductive coil may be connected to an electrical cable running within a downhole tool or between downhole tools The annular nonlinear coil may comprise a wavy coil wire. The wavy coil wire may comprise an average of between 1 and 5 waves per inch of coil length around the interior core region of the ferrite channel. The waves may be constrained within the core region of the ferrite channel and may not exceed the major diameter of the core region of the ferrite channel. The wave height may be between an average of 3% and 95% of the major diameter of the core region of the ferrite channel.

The annular electrically conductive nonlinear coil may comprise a helix wire comprising vertical loops. The helix may comprise an average of 2 to 27 vertical loops per inch of the coil's length. The helix coil may be constrained within the core region of the ferrite channel. The vertical loops may not be spaced evenly along the length of the coil. The diameter of the loops may be between 3% and 95% of the major diameter of the core region of the ferrite channel.

The annular electrically conductive nonlinear coil may comprise a wavy vertical ribbon or strip. The wavy vertical strip may comprise vertically oriented corrugations along its length. The strip may comprise an average of 2 to 6 corrugations per inch of the coil's length. The strip may be constrained within the core region of the ferrite channel. The corrugations may or may not be spaced evenly along the length of the coil. The height of the strip may be between 3% and 95% of the major diameter of the core region of the ferrite channel.

The annular housing may comprise a metal ring, a nonmetal ring, an annular groove in the body of a downhole tool, or an annular polymeric block. The downhole tool may comprise a drill pipe, a sub within the drill string, a tool positioned along the drillstring or within the bottom hole assembly, or a drill bit. The surfaces of the annular groove in the body of the downhole tool may comprise a hardness greater than the hardness of the body of the downhole tool adjacent the annular groove. The ferrite channel and the nonlinear coil may be molded within the polymeric block.

The annular polymeric block may comprise a polymer selected from the group consisting of polyether ether ketone (PEEK), polytetrafluoroethylene (PTFE) (Teflon), polybenzimidazole (PBI), polyoxymethylene (Delrin), and polydicyclopentadiene (pDCPD). The annular polymeric block may comprise a combination of one or more polymeric materials. The annular polymeric block may be a composite of polymer and electrically insulating and magnetically conductive materials. The presence of the magnetic materials within the polymeric block may prevent stray electromagnetic interference with the functioning of the transmission system. The annular polymeric block may comprise a volume of Fe and Mn particles averaging between 10% and 65% of the volume of polymer. The volume of Fe and Mn particles may range in average diameter between 10 nm and 3 mm.

The annular polymeric block comprising a bumper on its peripheral side wall. The polymeric block may comprise one or more bumpers around the outside periphery of the block. The bumper may be intermittent or continuous around the periphery of the block. The bumper may be aligned with a bumper seat formed in the sidewall of the annular groove. The bumper may assist in positioning and removably fixing the transmission system in the annular groove. The bumper may comprise an anterior dimple that may contribute to the resilience of the bumper as it is fitted into and removed from the housing or groove.

The annular polymeric block may further comprise at least one void opening molded within the block. The presence of the void openings may contribute to the resilience of the polymeric block as it is installed into the downhole tool housing or experiences the forces concomitant with tool string makeup and drilling. The added resilience in the block may promote the longevity of transmission system. A void opening within the polymeric block may be aligned proximate to the bumper.

The annular polymeric block may comprise a gasket protruding from its bottom side surface. The block may comprise a gasket seat located within its bottom side surface in which a gasket may be installed. The gasket may comprise a natural or artificial material suitable for withstanding the harsh, dynamic conditions downhole drilling. The gasket may be molded within the block and a portion of the gasket protruding from the gasket's bottom side surface. The gasket may promote rotational stability in the transmission system.

The gasket may comprise an opening through which an end of the nonlinear coil, or a wire attached to the nonlinear coil, may exit the housing, as it passes from the ferrite channel and the annular block or other housing on its way to connect with a cable running within the downhole tool. The gasket may seal the exiting wire and the transmission system from the downhole environment. A similar gasket may be used to seal the exiting wire that leads to ground. The annular housing and the annular ferrite channel may comprise one or more ferrite segments comprising openings for the passage of at least one end of the annular electrically conductive nonlinear coil. A continuous ferrite channel may also comprise openings to allow the passage of the annular coil to connect with another cable in the tool or to connect with ground. The gasket may extend from the bottom of the core region of the ferrite channel through the housing and into body of the downhole tool adjacent the transmission system. Sealing the entire length of the exiting coil wire as it passes into the tool body.

The transmission system may further comprise an annular nonlinear electrically conductive coil comprising a twisted pair of wires as further described in prior art FIGS. 20 and 21.

The transmission system may further comprise an annular nonlinear electrically conductive coil comprises an electrically conductive core as further described in prior art FIGS. 15-18.

The remainder of the summary is taken from the '218 reference. The descriptions set forth herein apply equally to FIGS. 1-5, except as altered or modified by this application. In view of the foregoing, it is a primary object of the present invention to interconnect downhole-drilling components by way of a high-speed data transmission system or network. A high-speed network in accordance with the invention enables high-speed data transmission between downhole components, and between downhole components and the ground's surface. It is a further object of the present invention to provide apparatus and methods to acquire or gather data at various points or nodes along the drill string using the data transmission system, for transmission along the network. It is yet a further object to enable control or other signals to be transmitted from the surface to downhole components or tools connected by the data transmission system to the network.

Consistent with the foregoing objects, and in accordance with the invention as embodied and broadly described herein, a downhole network is disclosed in one embodiment of the present invention as including a bottom-hole node interfacing to a bottom-hole assembly located proximate the bottom end of a drill string. A top-hole node is connected proximate the top end of the drill string. One or several intermediate nodes are located along the drill string between the bottom-hole node and the top-hole node. The intermediate nodes are configured to receive and transmit data packets transmitted between the bottom-hole node and the top-hole node. A communications link, integrated into the drill string, is used to operably connect the bottom-hole node, the intermediate nodes, and the top-hole node.

In selected embodiments, a personal or other computer may be connected to the top-hole node, to analyze data received from the intermediate and bottom-hole nodes. The personal computer may include a user interface to display data received from the intermediate and bottom-hole nodes.

The bottom hole assembly may include various sensors or tools, including but not limited to pressure sensors, inclinometers, temperature sensors, thermocouplers, accelerometers, imaging devices, and seismic devices. In selected embodiments, the intermediate nodes may function primarily as repeaters. In other embodiments, the intermediate nodes may perform functions such as signal amplification, filtering, error checking, routing, and switching.

In selected embodiments, a module, housing the intermediate node, may be designed such that it may be inserted at a point along the drill string. The intermediate node may be further configured to gather data from at least one of a downhole sensor and a downhole tool, located along the drill string, proximate the intermediate node.

As with most networks, the top-hole node, the intermediate nodes, and the bottom-hole node may be assigned a unique network address. Likewise, data packets transmitted between the nodes may include a source address, identifying the source of a packet, and a destination address, identifying the destination of a packet. Data packets may carry various types of information, such as data originating from pressure sensors, inclinometers, temperature sensors, thermocouplers, accelerometers, imaging devices, and seismic devices.

In another aspect of the present invention, a method for transmitting information along a drill string includes transmitting, from a bottom-hole node, data packets along a communications link integrated into the drill sting. The method further includes receiving, by an intermediate node, the data packets. The intermediate node is located at an intermediate location along the drill string, and operably connected to the communications link. The method further includes amplifying, by the intermediate node, the data packets, and forwarding the data packets to a top-hole node operably connected to the communications link.

In certain embodiments, a method in accordance with the invention may further include receiving, by a personal computer, data packets from the top-hole node, for analysis. The personal computer may display, on a user interface, data received from the intermediate and bottom-hole nodes. A method may also include processing, by the intermediate node, data packets that are received. Processing may include tasks such as filtering, error checking, routing, and switching. The top-hole node, the intermediate node, and the bottom-hole node may each be assigned a unique network address.

In selected embodiments, a method in accordance with the invention may include gathering, by the intermediate node, a data packets containing data gathered from downhole sensors or downhole tools located near the intermediate node along the drill string. Each data packet may include a source address, identifying the source of a packet, and a destination address, identifying the destination of a packet. Data packets may carry data originating from devices or sensors such as pressure sensors, inclinometers, temperature sensors, thermocouplers, accelerometers, imaging devices, and seismic devices.

BRIEF DESCRIPTION OF DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings.

(Prior Art)

(Prior Art)

(Prior Art)

(Prior Art)

(Prior Art)

(Prior Art)

(Prior Art)

(Prior Art)

(Prior Art)

(Prior Art) FIGS. 15-18 are diagrams of embodiments of data transmission couplers.

(Prior Art) FIGS. 19-21 are diagrams of embodiments of twisted pairs data transmission couplers.

DETAILED DESCRIPTION

Figure 1:
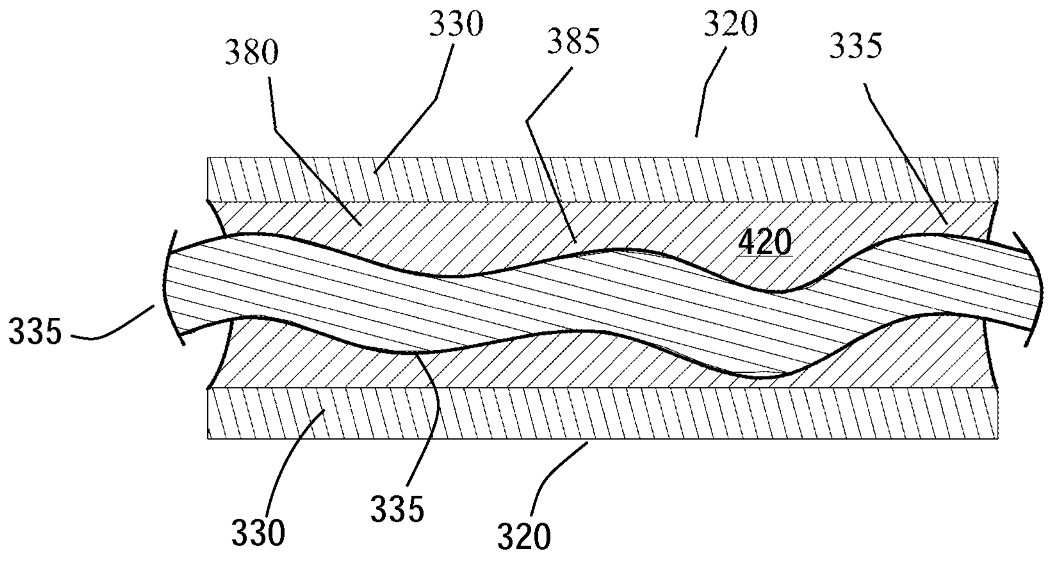
FIG. 1 is a diagram of a nonlinear coil segment set within a portion of a ferrite channel.

Referring to FIGS. 1-5, herein. A transmission system like that described herein and in the prior art figures that may be used for transmitting data and power in a downhole environment comprises an annular housing 310, see also 10 at prior art FIG. 14, and an annular ferrite channel 330 within the annular housing 310. The ferrite channel 330 may comprise electrically insulating and magnetically conductive materials. The ferrite channel 330 may comprise a plurality of ferrite segments, like 30 at prior art FIG. 14, closely aligned end for end or it may be a single, continuous ferrite channel 330 without interruptions. An example of an annular linear coil is depicted at 46, prior art FIG. 14. An annular nonlinear electrically conductive coil 335 may be disposed within a core region 420 defined by the inside surface 380 of the annular ferrite channel 330 and the open top surface 320 of the channel 330. The core region 420 may be filled or partially filled with a nonelectrically conductive filler material 315. The core region 420 may be substantially circular or noncircular having a major and minor diameter. An end of the annular nonlinear electrically conductive coil 410, 350 may be connected to an electrical cable running within a downhole tool or between downhole tools The annular nonlinear coil may comprise a wavy coil wire 335. The wavy coil wire 335 may comprise an average of between 1 and 5 waves 385 per inch of coil length around the interior core region 420 of the ferrite channel 330. The waves 385 may be constrained within the core region 420 of the ferrite channel 330 and may not exceed the major diameter of the core region 420 of the ferrite channel 330. The wave height may be between an average of 3% and 95% of the major diameter of the core region 420 of the ferrite channel 330.

The annular electrically conductive nonlinear coil 335 may comprise a helix wire 400 comprising vertical loops 405. The helix 400 may comprise an average of 2 to 27 vertical loops 405 per inch of the coil's length. The helix coil 400 may be constrained within the core region 420 of the ferrite channel 330. The vertical loops 405 may be spaced evenly or unevenly along the length of the coil 400. The diameter of the loops 405 may be between 3% and 95% of the major diameter of the core region 420 of the ferrite channel 330.

The annular electrically conductive nonlinear coil 390 may comprise a wavy vertical ribbon or strip 390. The wavy vertical strip 390 may comprise vertically oriented corrugations 395 along its length. The strip may comprise an average of 2 to 6 corrugations 395 per inch of the coil's length. The strip 390 may be constrained within the core region 420 of the ferrite channel 330. The corrugations 395 may or may not be spaced evenly along the length of the coil 390. The height of the strip 390 may be between 3% and 95% of the major diameter of the core region 420 of the ferrite channel 330.

The annular housing 310 may comprise a metal ring, a nonmetal ring, an annular groove in the body of a downhole tool, or an annular polymeric block. An example of a metal ring is shown at 10, prior art FIG. 14. The downhole tool may comprise a drill pipe, a sub within the drill string, a tool positioned along the drillstring or within the bottom hole assembly, or a drill bit. See prior art FIG. 6. The surfaces of the annular groove 325 in the body of the downhole tool 305 may comprise a hardness greater than the hardness of the body 305 of the downhole tool 305 adjacent the annular groove 325. The ferrite channel 330 and the nonlinear coil 335 may be molded within the polymeric block 310.

The annular polymeric block 310, 310A may comprise a polymer selected from the group consisting of polyether ether ketone (PEEK), polytetrafluoroethylene (PTFE) (Teflon), polybenzimidazole (PBI), polyoxymethylene (Delrin), and polydicyclopentadiene (pDCPD). The annular polymeric block may comprise a combination of one or more polymeric materials. The annular polymeric block 310 may be a composite of polymer and electrically insulating and magnetically conductive materials. The presence of the magnetic materials within the polymeric block 310, 310A may prevent stray electromagnetic wave interference with the functioning of the transmission system. The annular polymeric block 310 may comprise a volume of Fe and Mn particles averaging between 10% and 65% of the volume of polymer. The volume of Fe and Mn particles may range in average diameter between 10 nm and 3 mm.

The annular polymeric block 310 may comprise a bumper 355 on its peripheral side wall. The polymeric block 310 may comprise one or more bumpers 355 around the outside periphery of the block 310. The bumper 355 may be intermittent or continuous around the periphery of the block 310. The bumper 355 may be aligned with a bumper seat 425 formed in the sidewall of the annular groove 325. The bumper 355 may assist in positioning and removably fixing the transmission system in the annular groove 325. The bumper 355 may comprise an anterior dimple 360 that may contribute to the resilience of the bumper 355 as it is fitted into and removed from the housing or groove 325.

The annular polymeric block 310 may further comprise at least one void opening 365 molded within the block 310. The presence of the void openings 365 may contribute to the resilience of the polymeric block 310 as it is installed into the downhole tool housing 325 or experiences the forces concomitant with tool string makeup and drilling. The added resilience in the block 310 may promote the longevity of transmission system. A void opening 365 within the polymeric block 310 may be aligned proximate to the bumper 355.

The annular polymeric block 310 may comprise a gasket 345 protruding from its bottom side surface 370. The block 310 may comprise a gasket seat 375 located within its bottom side surface 370 in which a gasket 345 may be installed. The gasket 345 may comprise a natural or artificial material suitable for withstanding the harsh, dynamic conditions downhole drilling. The gasket 345 may be molded within the block 310 and a portion of the gasket 345 may protrude from the block's bottom side surface 370. The gasket 345 may promote rotational stability in the transmission system. The gasket 345 may comprise an opening through which an end of the nonlinear coil 335, or a wire 335 attached to the nonlinear coil 335, may exit the block 310, as it passes from the ferrite channel 330 and the annular block 310 or other housing on its way 350 to connect with a cable running within the downhole tool 305. The gasket 345 may seal the exiting wire 340, 350 and the transmission system from the downhole environment. A similar gasket 345 may be used to seal the exiting wire that leads to ground 415. The annular housing 310 of the annular ferrite channel 330 may comprise one or more ferrite segments, see FIG. 14 at 30, comprising openings for the passage of at least one end 340 of the annular electrically conductive nonlinear coil 335. A continuous ferrite channel may also comprise openings to allow the passage of the annular coil 335 to connect with another cable in the tool or to connect with ground 415. The gasket 345 may extend from the bottom of the core region 420 of the ferrite channel 330 through the housing 310 and into body of the downhole tool 305 adjacent the transmission system. Sealing the entire length of the exiting coil wire 340, 350 as it passes into the tool body 305.

The transmission system may further comprise an annular nonlinear electrically conductive coil comprising a twisted pair of wires as further described in prior art FIGS. 20 and 21 and related text.

The transmission system may further comprise an annular nonlinear electrically conductive coil comprises an electrically conductive core as further described in prior art FIGS. 15-18 and related text.

The following detailed description is taken from the '218 reference and applies equally to this application except where altered or modified by this application.

Figure 6:
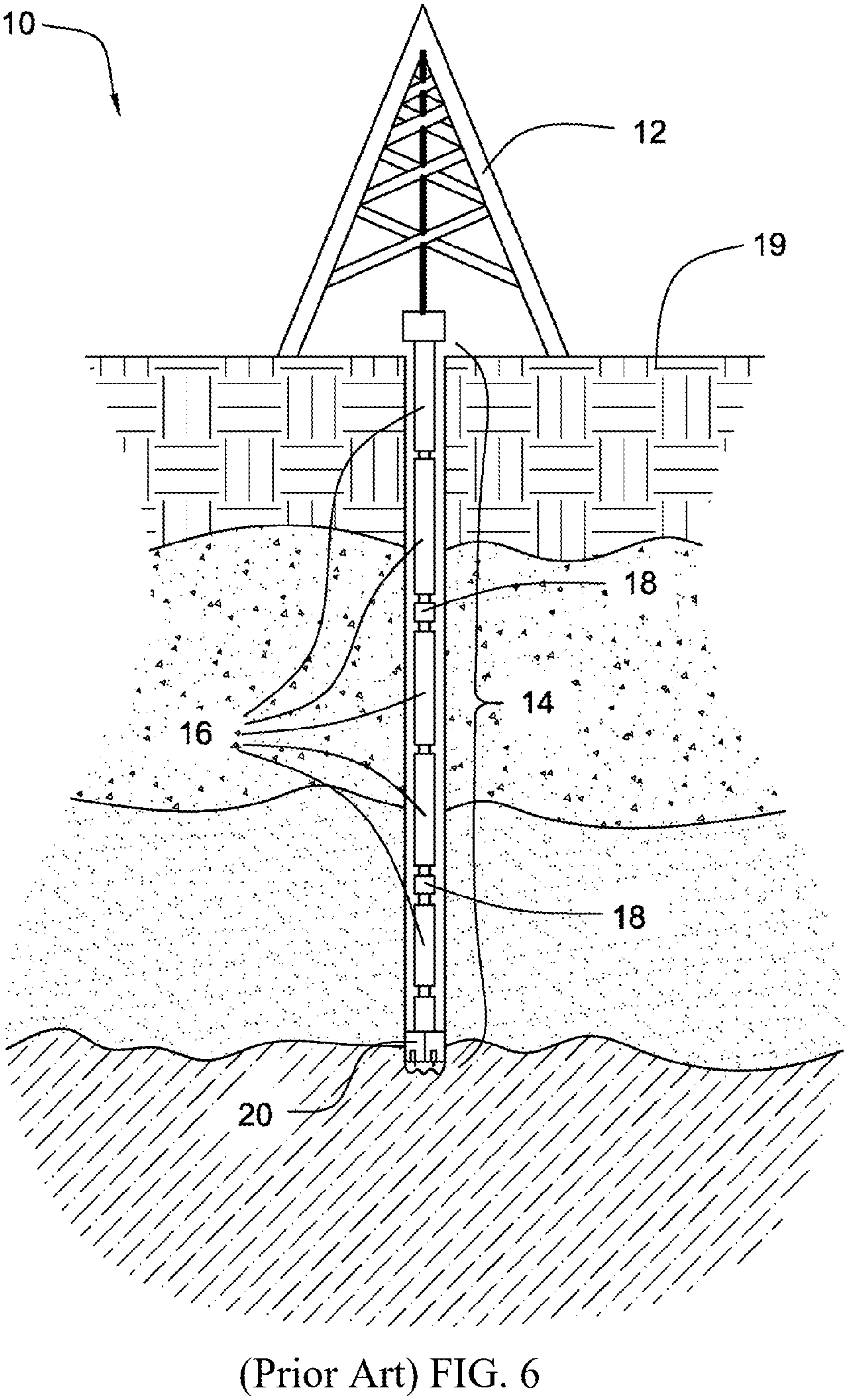
FIG. 6 is a profile view of a drill rig illustrating a context for using an apparatus and method in accordance with the invention.

Referring to (Prior Art) FIG. 6, a drill rig 10 may include a derrick 12 and a drill string 14 comprised of multiple sections of drill pipe 16 and other downhole tools 16. A bottom-hole assembly 20, connected to the bottom of the drill string 14, may include a drill bit, sensors, and other downhole tools. Because a drill string 14 may penetrate into the ground 20,000 feet or more, receiving and transmitting data from a bottom-hole assembly 20 to the surface may present numerous obstacles. Data must be transmitted along what may be hundreds of sections of drill pipe, and across each tool joint.

Signal loss may occur at each of the tool joints due to coupling losses and mismatched transmission elements. For example, in selected embodiments, an electrical signal transmitted along the drill string 14 may be transmitted as a magnetic field across tool joints, losing energy each time it is converted. Signal loss may also occur because of voltage drops, or other factors, in cable, wires, or other transmission media extending the length of the drill string 14. Thus, apparatus and methods are needed to ensure that data received from a bottom-hole assembly 20 or other downhole tools 16 is safely transmitted to the surface.

In selected embodiments in accordance with the invention, network nodes 18 may be inserted at desired intervals along the drill string 14, such as every 1000 to 5000 feet, to perform various functions. For example, the network nodes 18 may function as signal repeaters 18 to regenerate data signals traveling up and down the drill string 14. These nodes 18 may be integrated into an existing drill pipe 16 or downhole tool 16 or may be independent downhole tools 18.

Figure 7:
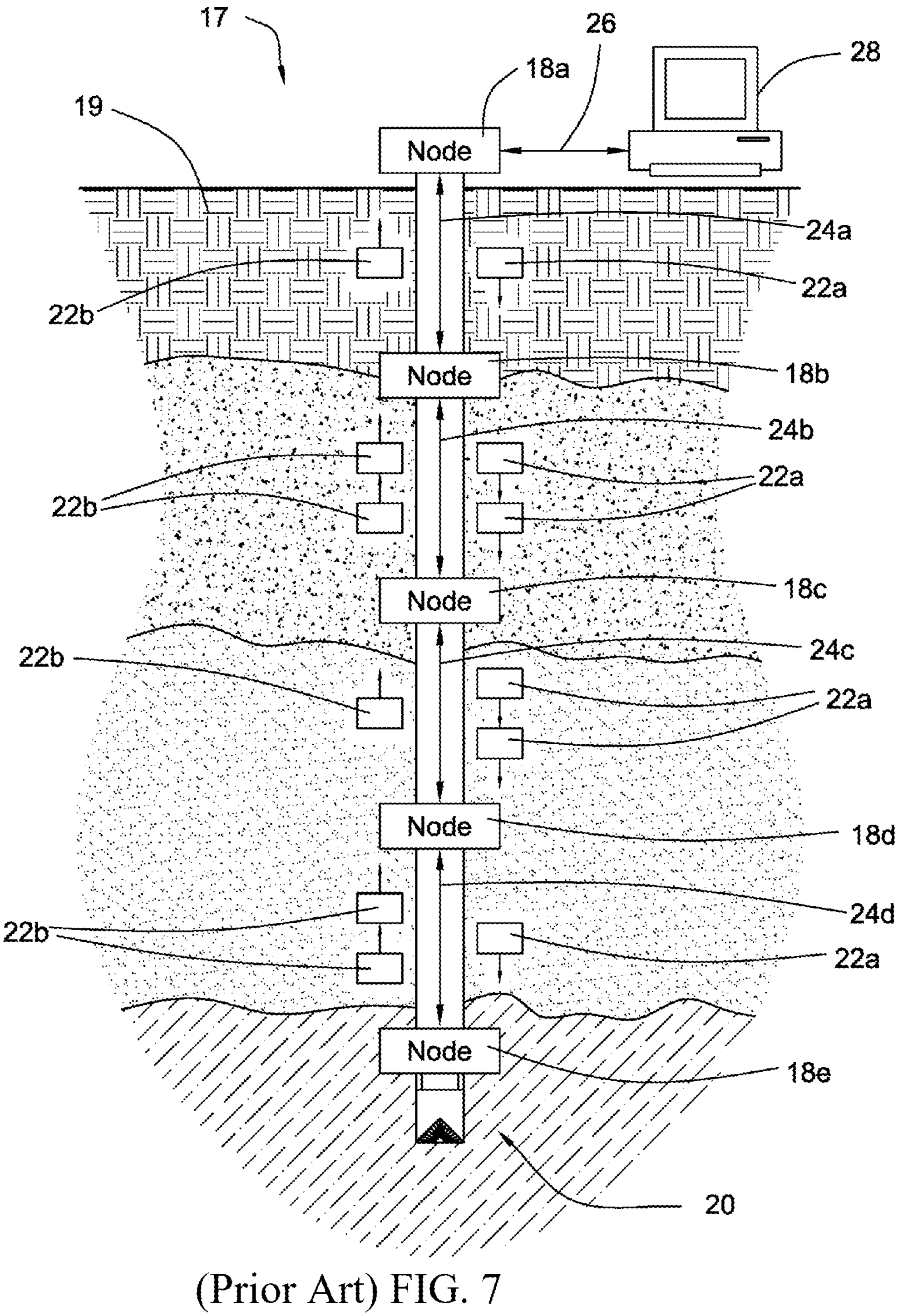
FIG. 7 is a profile view illustrating one configuration of various nodes used to implement a downhole network in accordance with the invention.

Referring to (Prior Art) FIG. 7, in selected embodiments a downhole network 17 may be used to transmit information along a drill string 14. A downhole network 17 may include multiple nodes 18*a* e spaced up and down a drill string 14. The nodes 18*a* e may be intelligent computing devices 18*a* e, or may be less intelligent connection devices, such as hubs or switches located along the length of the network 17. Each of the nodes 18 may or may not be addressed on the network 17. A node 18*e* may be located to interface with a bottom hole assembly 20 located at the end of the drill string 14. A bottom hole assembly 20 may include a drill bit, drill collar, and other downhole tools and sensors designed to gather data and perform various tasks.

Other intermediate nodes 18*b* d may be located or spaced to act as relay points for signals traveling along the downhole network 17 the network 17 and to provide interfaces 18*b* d to various tools or sensors located along the length of the drill string 14. Likewise, a top-hole node 18*a* may be located at the top or proximate the top of a drill string 14 to act as an interface to an analysis device 28, such as a personal computer 28.

Communication links 24*a* d may be used to connect the nodes 18*a* e to one another. The communication links 24*a* d may be comprised of cables or other transmission media integrated directly into tools 16 of the drill string 14, routed through the central bore of a drill string, or routed externally to the drill string. Likewise, in certain contemplated embodiments in accordance with the invention, the communication links 24*a* d may be wireless connections. In certain embodiments, the downhole network 17 may function as a packet-switched or circuit-switched network 17.

As in most networks, packets 22*a*, 22*b* may be transmitted between nodes 18*a* e. The packets 22*b* may be used to carry data from tools or sensors, located downhole, to an up-hole node 18*a*, or may carry protocols or data necessary to the functioning of the network 17. Likewise, selected packets 22*a* may be transmitted from up-hole nodes 18*a* to down-hole nodes 18*b* e. These packets 22*a*, for example, may be used to send control signals from a top-hole node 18*a* to tools or sensors located proximate various downhole nodes 18*b* e. Thus, a downhole network 17 may provide an effective means for transmitting data and information between components located downhole on a drill string 14, and devices located at or near the surface of the earth 19.

Figure 8:
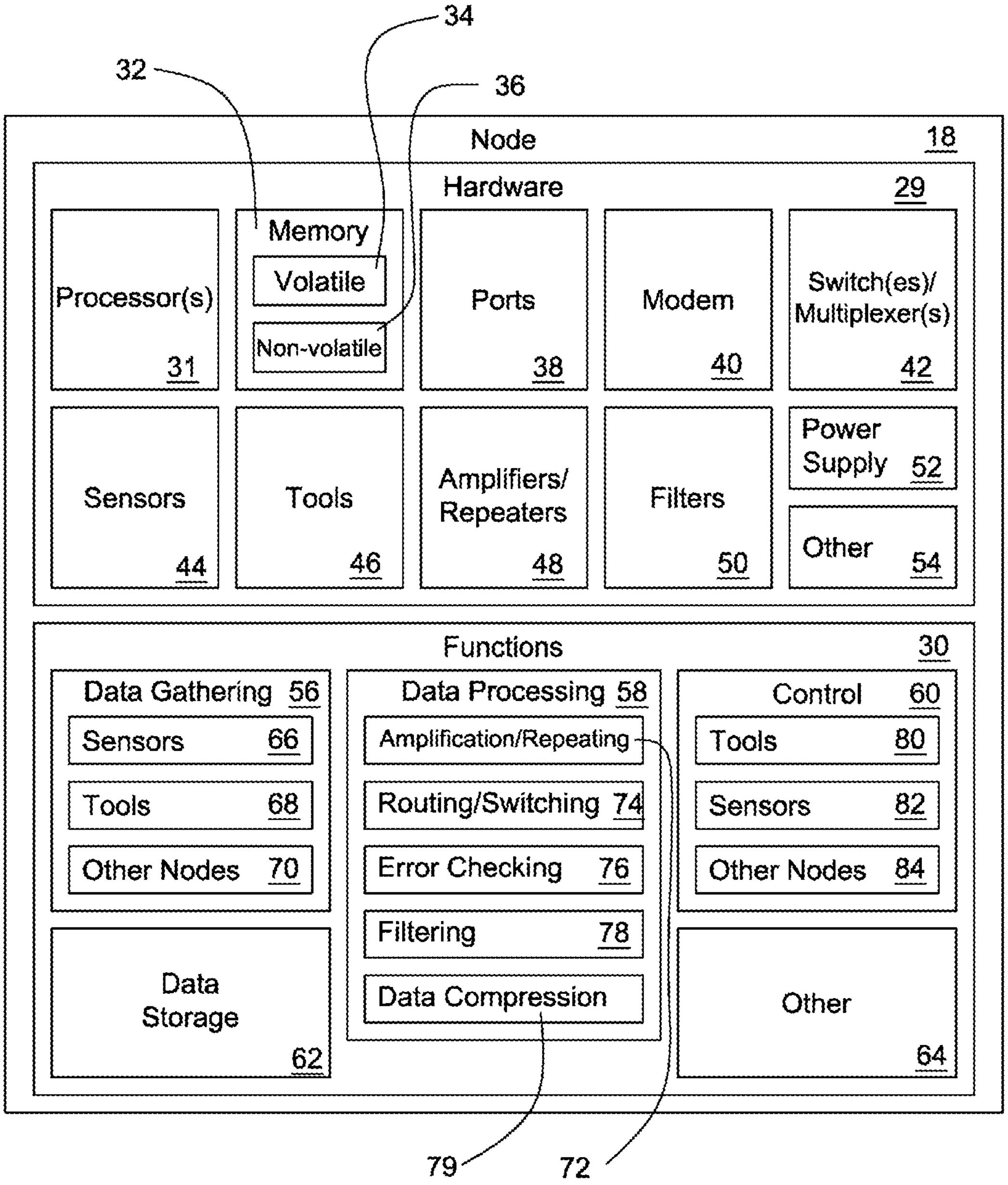
FIG. 8 is a schematic block diagram illustrating certain embodiments of hardware and corresponding functions provided by a node in accordance with the invention.

Referring to (Prior Art) FIG. 8, a network node 18 in accordance with the invention may include hardware 29 providing functionality to the node 18, as well as functions 30 performed by the node 18. The functions 30 may be provided strictly by the hardware 29, applications executable on the hardware 29, or a combination thereof. For example, hardware 29 may include one or several processors 31 capable of processing or executing instructions or other data. Processors 31 may include hardware such as busses, clocks, cache, or other supporting hardware.

Likewise, hardware 29 may include volatile 34 and non-volatile 36 memory 32 providing data storage and staging areas for data transmitted between hardware components 29. Volatile memory 34 may include random access memory (RAM) or equivalents thereof, providing high-speed memory storage. Memory 32 may also include selected types of non-volatile memory 36 such as read-only-memory (ROM), or other long term storage devices, such as hard drives and the like. Ports 38 such as serial, parallel, or other ports 38 may be used to input and output signals uphole or downhole from the node 18, provide interfaces with sensors or tools located proximate the node 18, or interface with other tools or sensors located in a drilling environment.

A modem 40 may be used to modulate digital data onto a carrier signal for transmission uphole or downhole along the network 17. Likewise, the modem 40 may demodulate digital data from signals transmitted along the network 17. A modem 40 may provide various built in features including but not limited to error checking, data compression, or the like. In addition, the modem 40 may use any suitable modulation type such as QPSK, OOK, PCM, FSK, QAM, or the like. The choice of a modulation type may depend on a desired data transmission speed, as well as unique operating conditions that may exist in a downhole environment. Likewise, the modem 40 may be configured to operate in full duplex, half duplex, or other mode. The modem 40 may also use any of numerous networking protocols currently available, such as collision-based protocols, such as Ethernet, or token-based protocols such as are used in token ring networks.

A node 18 may also include one or several switches 42 or multiplexers 42 to filter and forward packets between nodes 18 of the network 17, or combine several signals for transmission over a single medium. Likewise, a demultiplexer may be included with the multiplexer 42 to separate multiplexed signals received on a transmission line.

A node 18 may include various sensors 44 located within the node 18 or interfacing with the node 18. Sensors 44 may include data gathering devices such as pressure sensors, inclinometers, temperature sensors, thermocouplers, accelerometers, imaging devices, seismic devices, or the like. Sensors 44 may be configured to gather data for transmission up the network 17 to the grounds surface, or may also receive control signals from the surface to control selected parameters of the sensors 44. For example, an operator at the surface may actually instruct a sensor 44 to take a particular measurement. Likewise, other tools 46 located downhole may interface with a node 18 to gather data for transmission uphole, or follow instructions received from the surface.

Since a drill string may extend into the earth 20,000 feet or more, signal loss or signal attenuation that occurs when transmitting data along the downhole network 17, may be an important or critical issue. Various hardware or other devices of the downhole network 17 may be responsible for causing different amounts of signal attenuation. For example, since a drill string is typically comprised of multiple segments of drill pipe or other drill tools, signal loss may occur each time a signal is transmitted from one downhole tool to another. Since a drill string may include several hundred sections of drill pipe or other tools, the total signal loss that occurs across all of the tool joints may be quite significant. Moreover, a certain level of signal loss may occur in the cable or other transmission media extending from the bottom-hole assembly 20 to the surface.

To reduce data loss due to signal attenuation, amplifiers 48, or repeaters 48, may be spaced at various intervals along the downhole network 17. The amplifiers 48 may receive a data signal, amplify it, and transmit it to the next node 18. Like an amplifier 48, a repeater 48 may be used to receive a data signal and retransmit it at a higher power. However, unlike an amplifier 48, a repeater 48 may remove noise from the data signal.

Likewise, a node 18 may include various filters 50. Filters 50 may be used to filter out undesired noise, frequencies, and the like that may be present or introduced into a data signal traveling up or down the network 17. Likewise, the node 18 may include a power supply 52 to supply power to any or all of the hardware 29. The node 18 may also include other hardware 54, as needed, to provide desired functionality to the node 18.

The node 18 may provide various functions that are implemented by software, hardware, or a combination thereof. For example, functions 30 of the node 18 may include data gathering 56, data processing 58, control 60, data storage 62, and other functions 64. Data may be gathered 56 from sensors 66 located downhole, tools 68, or other nodes 70 in communication with a selected node 18. This data 56 may be transmitted or encapsulated within data packets transmitted up and down the network 17.

Likewise, the node 18 may provide various data processing functions 58. For example, data processing may include data amplification 72 or repeating 72, routing 74 or switching 74 data packets transmitted along the network 17, error checking 76 of data packets transmitted along the network 17, filtering 78 of data, as well as data compression 79 or decompression 79. Likewise, a node 18 may process various control signals 60 transmitted from the surface to tools 80, sensors 82, or other nodes 84 located downhole. Likewise, a node 18 may store data that has been gathered from tools, sensors, or other nodes 18 within the network 17. Likewise, the node 18 may include other functions 64, as needed.

Figure 9:
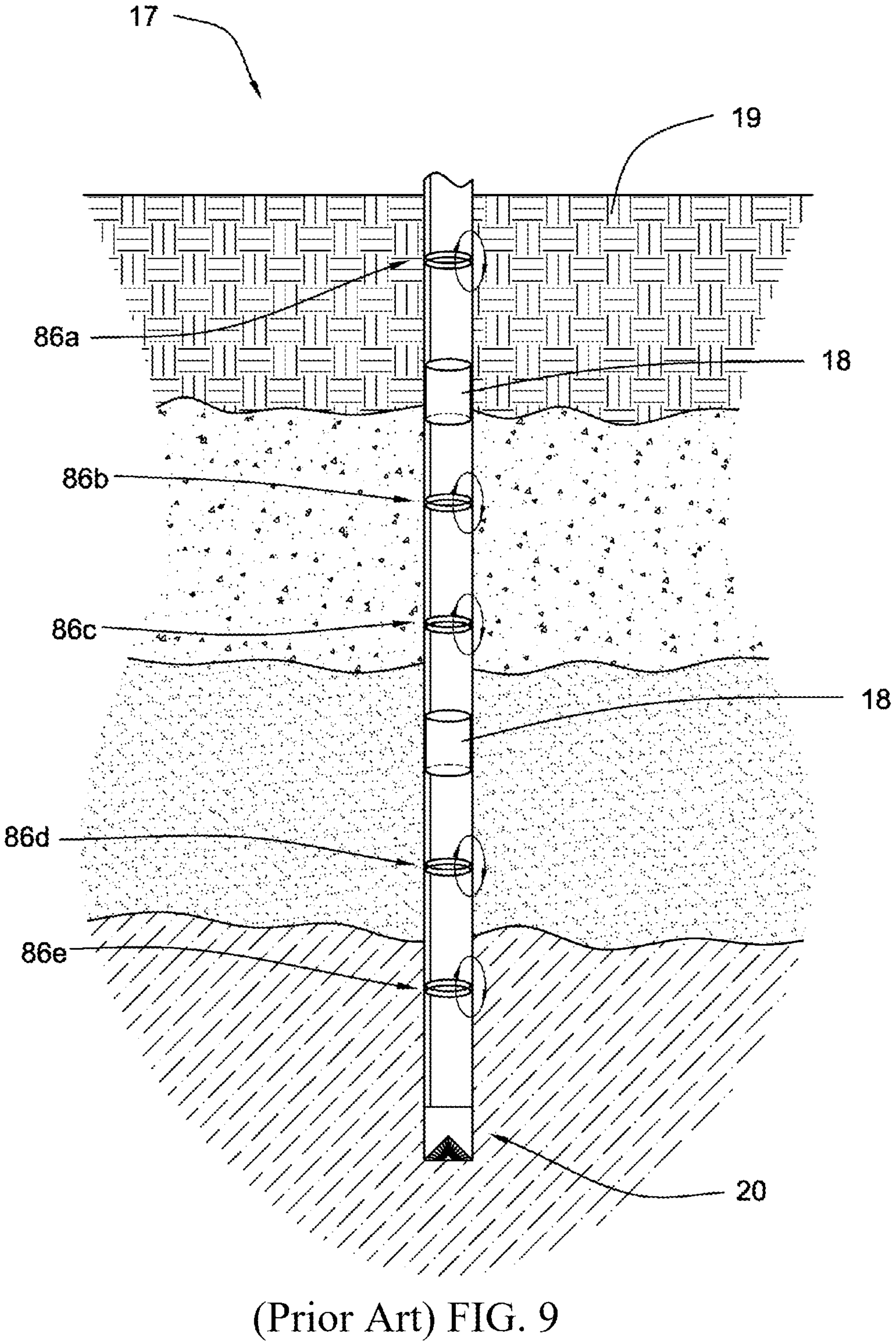
FIG. 9 is a profile view illustrating high-level functionality of one embodiment of a downhole network.

Referring to (Prior Art) FIG. 9, in one embodiment, a downhole network 17 in accordance with the invention may include various nodes 18 spaced at selected intervals along the network 17. Each of the nodes 18 may be in operable communication with a bottom-hole assembly 20. As data signals or packets travel up and down the network 17, transmission elements 86*a* e may be used to transmit signals across tool joints of a drill string 14.

As illustrated, in selected embodiments, inductive coils 86*a* e may be used to transmit data signals across tool joints. An inductive coil 86 may convert an electrical data signal to a magnetic field. A second inductive coil may detect the magnetic field and convert the magnetic field back to an electrical signal, thereby providing signal coupling across a tool joint. Thus, a direct electrical contact is not needed across a tool joint to provide effective signal coupling. Nevertheless, in other embodiments, direct electrical contacts may be used to transmit electrical signals across tool joints.

In selected embodiments, when using inductive coils 86*a* e, consistent spacing should be provided between each pair 86*a* e of inductive coils to provide consistent impedance or matching across each tool joint. This will help to prevent excessive signal loss caused by signal reflections or signal dispersion at the tool joint.

Figure 10:
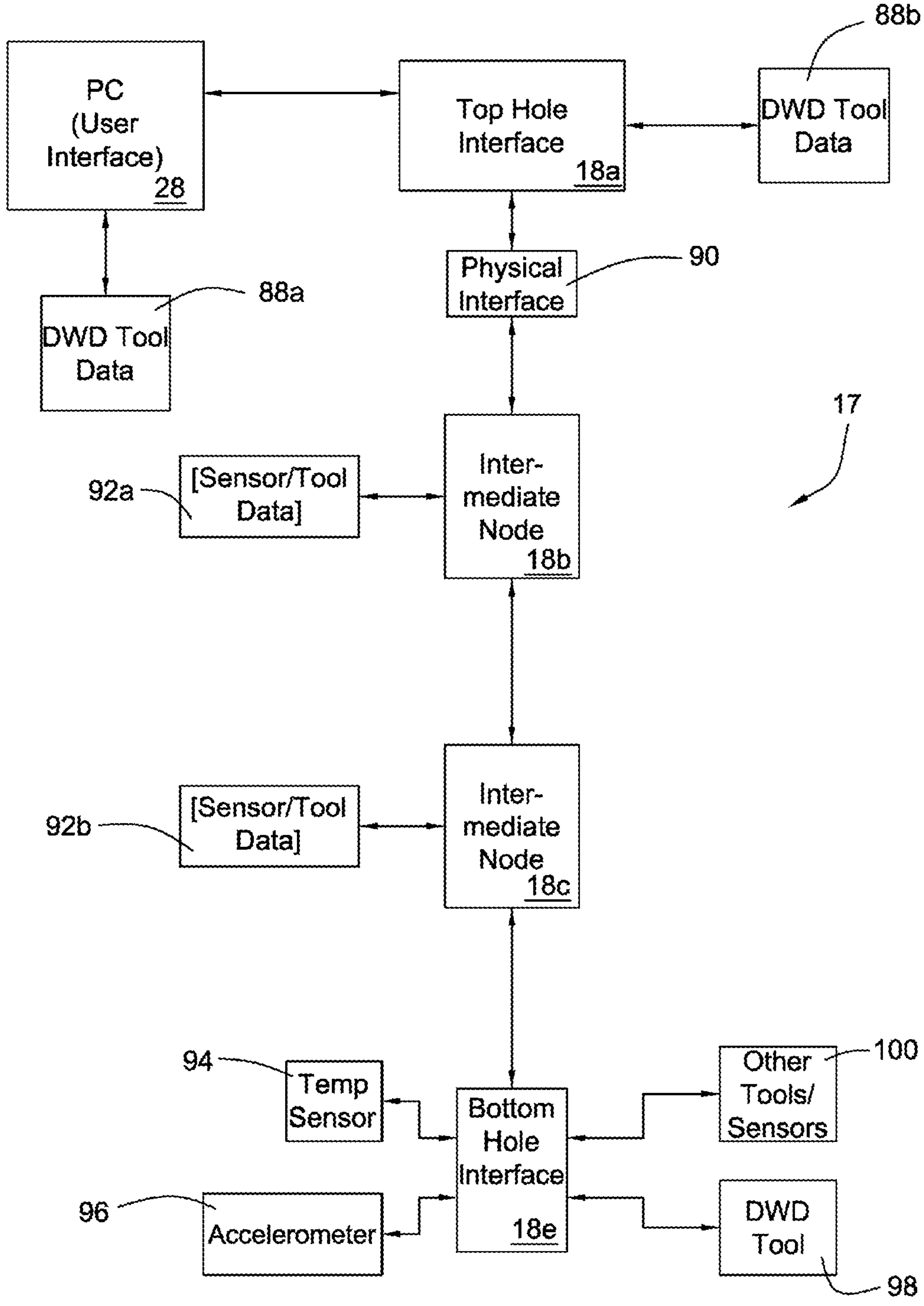
FIG. 10 is a schematic block diagram illustrating one embodiment of nodes used to implement a downhole network in accordance with the invention, and various devices, sensors, and tools interfacing with the nodes.

Referring to (Prior Art) FIG. 10, in one embodiment, a downhole network 17 in accordance with the invention may include a top-hole interface 18*a* and a bottom-hole interface 18*e*. A bottom-hole interface 18*e* may interface to various components located in or proximate a bottom-hole assembly

20. For example, a bottom-hole interface 18*e* may interface with a temperature sensor 94, an accelerometer 96, a DWD (diagnostic-while-drilling) tool 98, or other tools 100 or sensors 100, as needed.

The bottom-hole interface 18*e* may communicate with an intermediate node 18*c* located up the drill string. The intermediate node 18*c* may also interface with or receive tool or sensor data 92*b* for transmission up or down the network 17. Likewise, other nodes such as a second intermediate node 18*b* may be located along the drill string and interface with other sensors or tools to gather data 92*a* therefrom. Any number of intermediate nodes 18*b*, 18*c* may be used along the network 17 between the top-hole interface 18*a* and the bottom-hole interface 18*e*.

A physical interface 90 may be provided to connect network components to a drill string 14. For example, since data is transmitted directly up the drill string on cables or other transmission media integrated directly into drill pipe or other drill string components, the physical interface 90 provides a physical connection to the drill string so data may be routed off the drill string 14 to network components, such as a top-hole interface 18*a*, or personal computer 28.

For example, a top-hole interface 18*a* may be operably connected to the physical interface 90. The top-hole interface 18*a* may be connected to an analysis device 28 such as a personal computer 28. The personal computer 28 may be used to analyze or examine data gathered from various downhole tools or sensors. Likewise, DWD tool data 18*a* may be saved or output from the personal computer 28. Likewise, in other embodiments, DWD tool data 88*b* may be extracted directly from the top-hole interface 18*a* for analysis.

Figure 11:
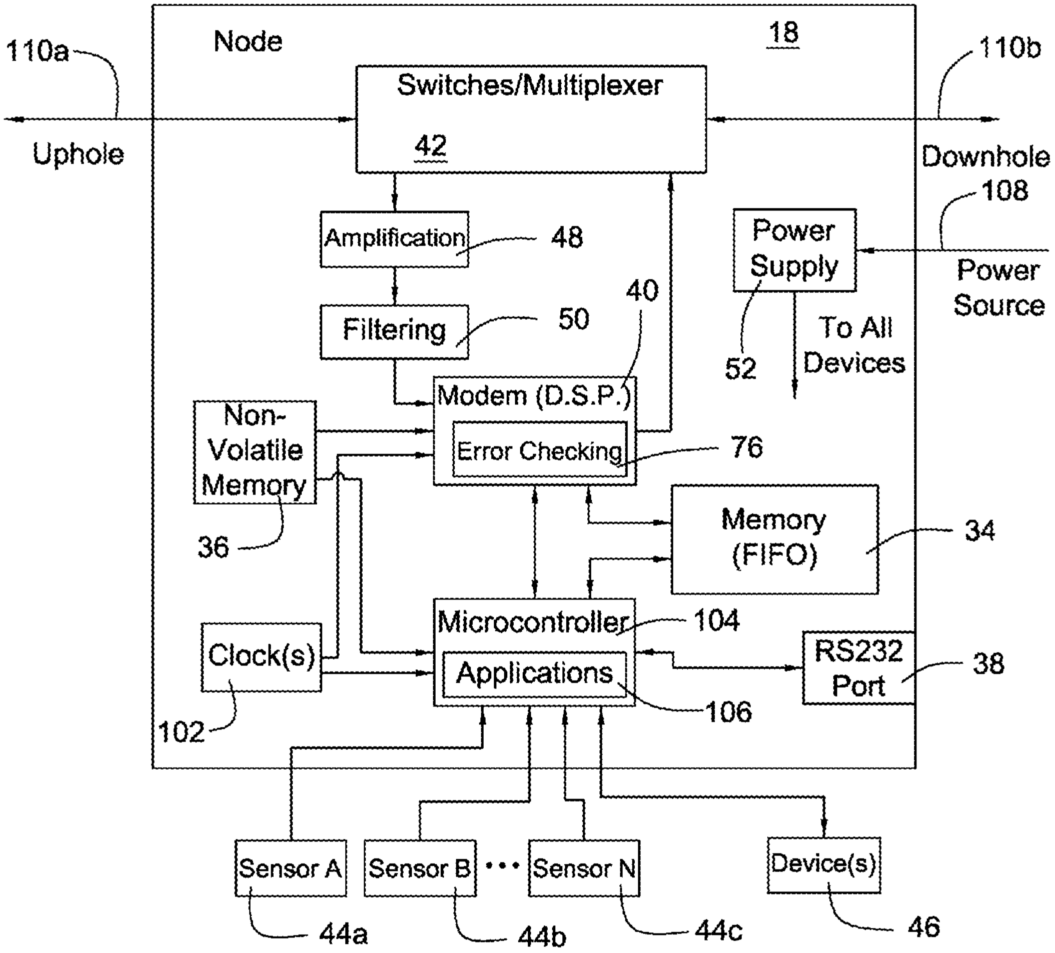
FIG. 11 is a schematic block diagram illustrating additional detail of one embodiment of a node in accordance with the invention.

Referring to (Prior Art) FIG. 11, in selected embodiments, a node 18 may include various components to provide desired functionality. For example switches 42, multiplexers 42, or a combination thereof may be used to receive, switch, and multiplex or demultiplex signals, received from other up-hole 110*b* and downhole 110*a* nodes 18. The switches/multiplexers 42 may direct traffic such as data packets or other signals into and out of the node 18, and may ensure that the packets or signals are transmitted at proper time intervals, frequencies, or a combination thereof.

In certain embodiments, the multiplexer 42 may transmit several signals simultaneously on different carrier frequencies. In other embodiments, the multiplexer 42 may coordinate the time-division multiplexing of several signals. Signals or packets received by the switch/multiplexer 42 may be amplified 48 and filtered 50, such as to remove noise. In certain embodiments received signals may simply be amplified 48. In other embodiments, the signals may be received, data may be demodulated therefrom and stored, and the data may be remodulated and retransmitted on a selected carrier frequency having greater signal strength. A modem 40 may be used to demodulate analog signals received from the switch/multiplexer into digital data and modulate digital data onto carriers for transfer to the switches/multiplexer where they may be transmitted uphole or downhole. The modem 40 may also perform various tasks such as error-checking 76. The modem 40 may also communicate with a microcontroller 104. The microcontroller 104 may execute any of numerous applications 106. For example, the microcontroller 104 may run applications 106 whose primary function is to acquire data from one or a plurality of sensors 44*a-c*. For example, the microcontroller 104 may interface to sensors 44 such as inclinometers, thermocouples, accelerometers, imaging devices, seismic data gathering devices, or other sensors. Thus, the node 18 may include circuitry that functions as a data acquisition tool.

In other embodiments, the microcontroller 104 may run applications 106 that may control various devices 46 located downhole. That is, not only may the node 18 be used as a repeater, and as a data gathering device, but may also be used to receive or provide control signals to control selected devices as needed. The node 18 may include a memory device 34 such as a FIFO 34 that may be used to store data needed by or transferred between the modem 40 and the microcontroller 104.

Other components of the node 18 may include non-volatile memory 36, which may be used to store data, such as configuration settings, node addresses, system settings, and the like. One or several clocks 102 may be provided to provide clock signals to the modem 40, the microcontroller 104, or any other device. A power supply 52 may receive power from an external power source such as batteries. The power supply 52 may provide power to any or all of the components located within the node 18. Likewise, an RS232 port 38 may be used to provide a serial connection to the node circuit 18.

Thus, the node 18 described in FIG. 6 may have many more functions than those supplied by a simple signal repeater. The node 18 may provide many of the advantages of an addressable node on a local area network. The addressable node may amplify signals received from uphole 110*b* or downhole 110*a* sources, be used as a point of data acquisition, and be used to provide control signals to desired devices 46. These represent only a few examples of the versatility of the node 18. Thus, the node 18, although useful and functional as a repeater 30, may have a greatly expanded capability.

Figure 12:
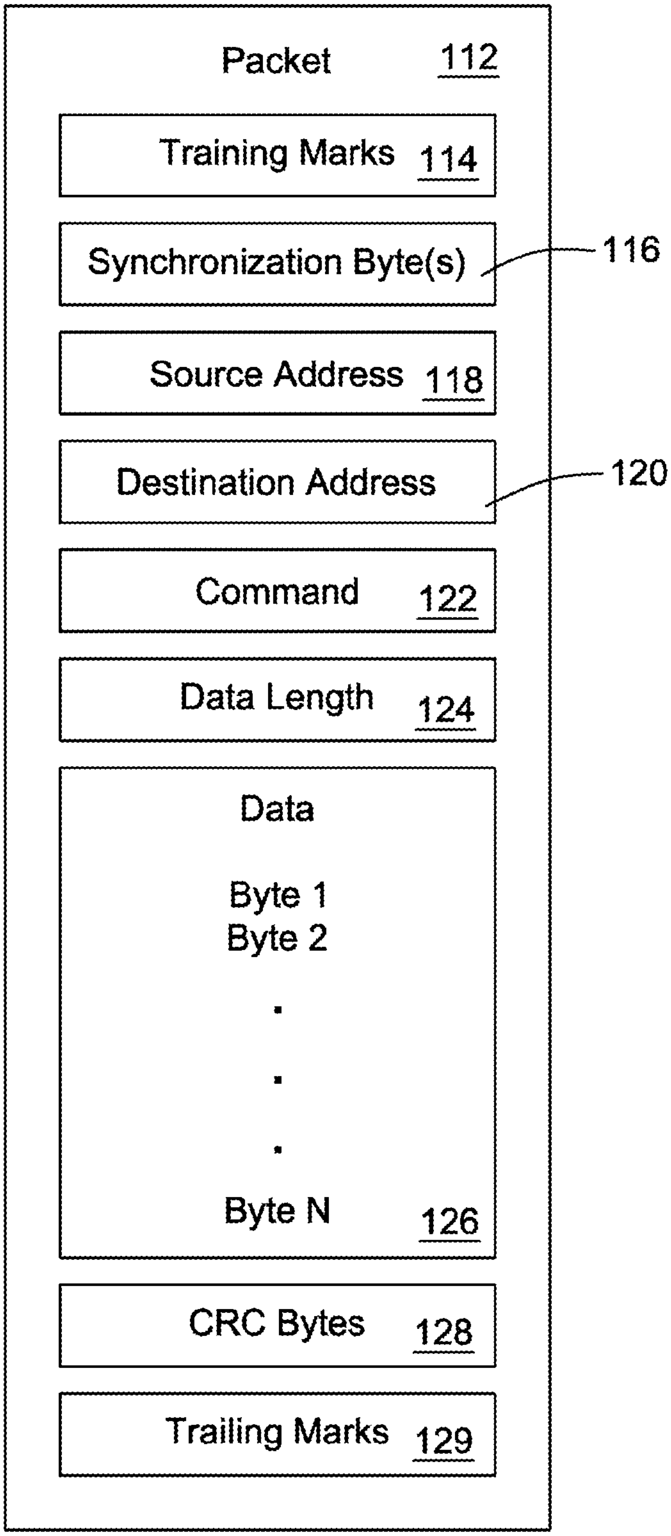
FIG. 12 is a schematic block diagram illustrating one embodiment of a packet used to transmit data between nodes.

Referring to (Prior Art) FIG. 12, a packet 112 containing data, control signals, network protocols, and the like may be transmitted up and down the drill string. For example, in one embodiment, a packet 112 in accordance with the invention may include training marks 114. Training marks 114 may include any overhead, synchronization, or other data needed to enable another node 18 to receive a particular data packet 112.

Likewise, a packet 112 may include one or several synchronization bytes 116. The synchronization byte 116 or bytes may be used to synchronize the timing of a node 18 receiving a packet 112. Likewise, a packet 112 may include a source address 118, identifying the logical or physical address of a transmitting device, and a destination address 120, identifying the logical or physical address of a destination node 18 on a network 17.

A method for synchronizing the timing of a node 18 receiving a packet 112 comprises determining a total signal latency between a control device and the node and then sending a synchronizing time from the control device to the node adjusted for the signal latency. Electronic time stamps may be used to measure latency between the control device and the node.

A method for triggering an action of the node synchronized to an event else where on the network comprises determining latency, sending a latency adjusted signal, and performing the action. The latency may be determined between a control device located near the surface and the node. The latency adjusted signal for triggering an action is sent to the node and the action is performed downhole synchronized to the event.

An apparatus for fixing computational latency within a deterministic region in a node may comprise a network interface modem, a high priority module and at least one deterministic peripheral device. The network interface modem is in communication with the network. The high priority module is in communication with the network interface modem. The at least one deterministic peripheral device is connected to the high priority module. The high priority module comprises a packet assembler/disassembler, and hardware for performing at least one operation.

A packet 112 may also include a command byte 122 or bytes 122 to provide various commands to nodes 18 within the network 17. For example, commands 122 may include commands to set selected parameters, reset registers or other devices, read particular registers, transfer data between registers, put devices in particular modes, acquire status of devices, perform various requests, and the like.

Likewise, a packet 112 may include data or information 124 with respect to the length 124 of data transmitted within the packet 112. For example, the data length 124 may be the number of bits or bytes of data carried within the packet 112. The packet 112 may then include data 126 comprising a number of bytes. The data 126 may include data gathered from various sensors or tools located downhole, or may contain control data to control various tools or devices located downhole. Likewise one or several bytes 128 may be used to perform error checking of other data or bytes within a packet 112. Trailing marks 129 may trail other data of a packet 112 and provide any other overhead or synchronization needed after transmitting a packet 112. One of ordinary skill in the art will recognize that network packets 112 may take on many forms and contain varied information. Thus, the example presented herein simply represents one contemplated embodiment in accordance with the invention, and is not intended to limit the scope of the invention.

Figure 13:
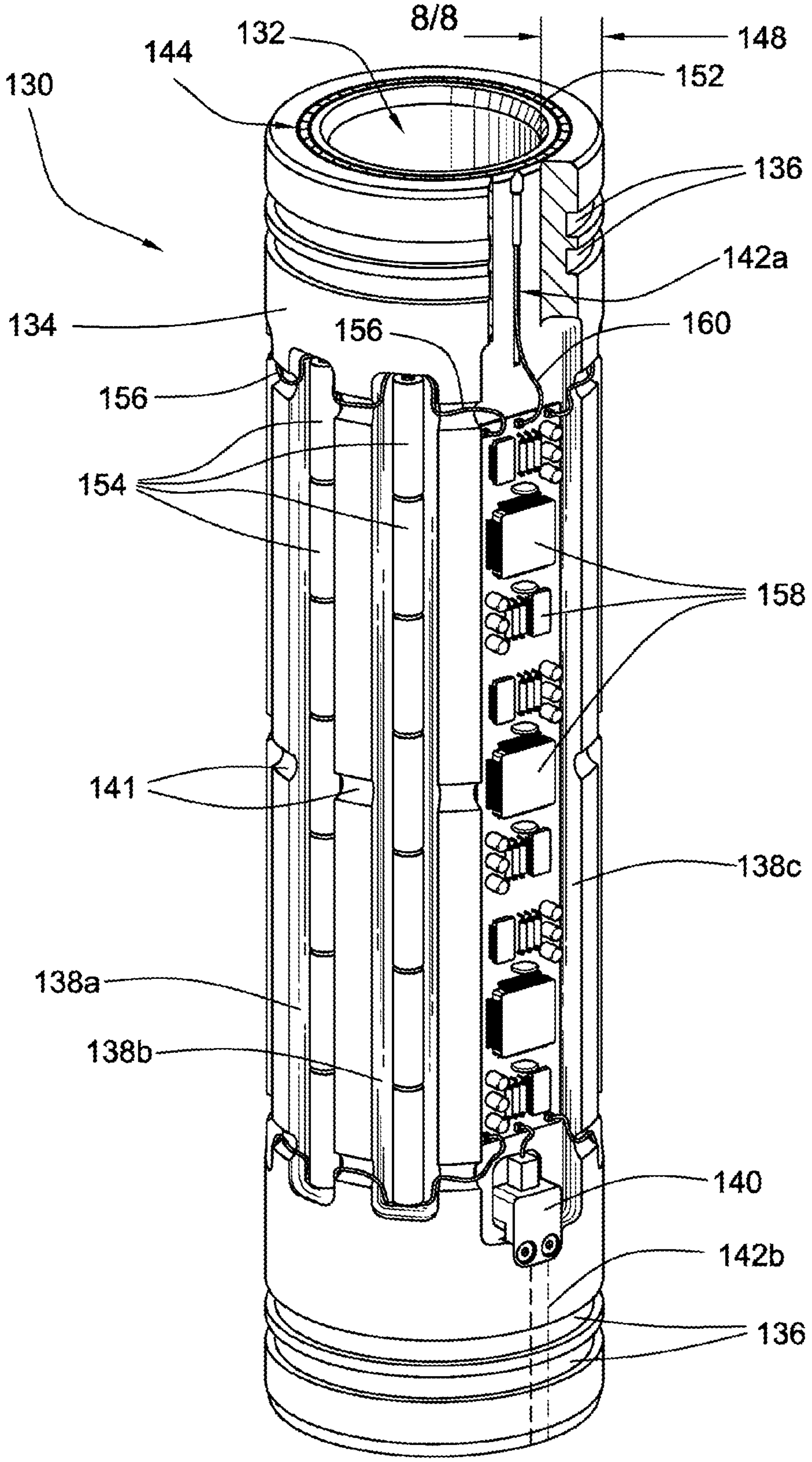
FIG. 13 is perspective view illustrating one embodiment of a downhole module that may be physically installed into a drill string to implement a node in accordance with the invention.

Referring to (Prior Art) FIG. 13, a module 130 housing the node 18 may include a cylindrical housing 134 defining a central bore 132. The cylindrical housing 134 may be substantially circular, or in other embodiments, may be polygonal. The central bore 132 may have a diameter that is slightly smaller than the inner bore diameter of a typical section of drill pipe 16 to accommodate and provide space to components of the node 158.

Nevertheless, in selected embodiments, as batteries and electronic components become more compact, it is feasible that the central bore 132 of the module 130 could be substantially equal to that normally encountered in sections of drill pipe 16 or other downhole tools 16. The module 130 may be configured for insertion into a host downhole tool 16. Thus, the module 130 may be removed or inserted as needed to access or service components located therein.

In selected embodiments, the module 130 may include one or several grooves 136 or seal contact surfaces 136 to seal the module 130 within a host downhole tool. Seals inserted into the seal contact surfaces 136 or grooves 136 may prevent fluids such as drilling mud, lubricants, oil, water, and the like from contaminating circuitry or components inside the module 130. Moreover, the entry of other substances such as dirt, rocks, gasses, and the like, may also be prevented.

In selected embodiments, the module 130 may include one or several recesses 138*a* c to house various components contained in the module 130. Selected recesses 138 may contain circuitry 158 while others 138 may be used for batteries 154 or other components. One or several channels 141 may be milled or formed into the cylindrical housing 134 to provide for the routing of wires between recesses 138. In selected embodiments, a connector 140 may be used to connect node circuitry 158 to a cable, wire, or other link, traveling up or down the drill string 14.

As illustrated, the module 130 may be characterized by a general wall thickness 148. Likewise, in regions proximate recesses 138 or other channels 141, a thinner wall thickness may be present. Nevertheless, a critical wall thickness should be maintained to provide structural reliability to the module 130 to support stresses encountered in a downhole environment. The cylindrical housing 134 may be constructed of any suitable material including steel, aluminum, plastics, and the like, capable of withstanding the pressures, stresses, temperatures, and abrasive nature of a downhole environment.

As illustrated, one or several transmission paths 142 may be milled or formed into the wall of the module 130 to provide an outlet for cables, wires, or other transmission media exiting the recess 138. In selected embodiments, a connector 140 may be provided to simply link up with or connect to node circuitry 158, or in other embodiments, a channel 142*a* may enable the routing of cables, wires, and the like from a node circuit 158, within the recess 138*c*, to a transmission element 152. A transmission element 152 may be provided in an annular recess 144 milled or otherwise formed into the end of the cylindrical housing 134.

As illustrated, a module 130 is equipped with components or circuitry 158 needed to provide functionality to the module 130. For example, batteries 154 connected in series or parallel may be inserted into selected recesses 138 of the module 130. Wires 156 may be routed through channels 141 interconnecting the recesses 138 to connect the batteries 154 together, or to connect the batteries to node circuitry 158.

Likewise, node circuitry 158, or components 158, may be located within other recesses 138. As was previously stated, a conductor 160, cable 160, or other transmission media 160, may travel from the node circuitry 158 to a transmission element 152. The transmission element 152 may transmit energy to another transmission element in contact therewith. The transmission element 152 may have an annular shape and may transmit energy by direct electrical contact, or may convert an electrical current to a magnetic field. The magnetic field may then be detected by another transmission element in close proximity thereto located on a subsequent downhole tool 16.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

Figure 14:
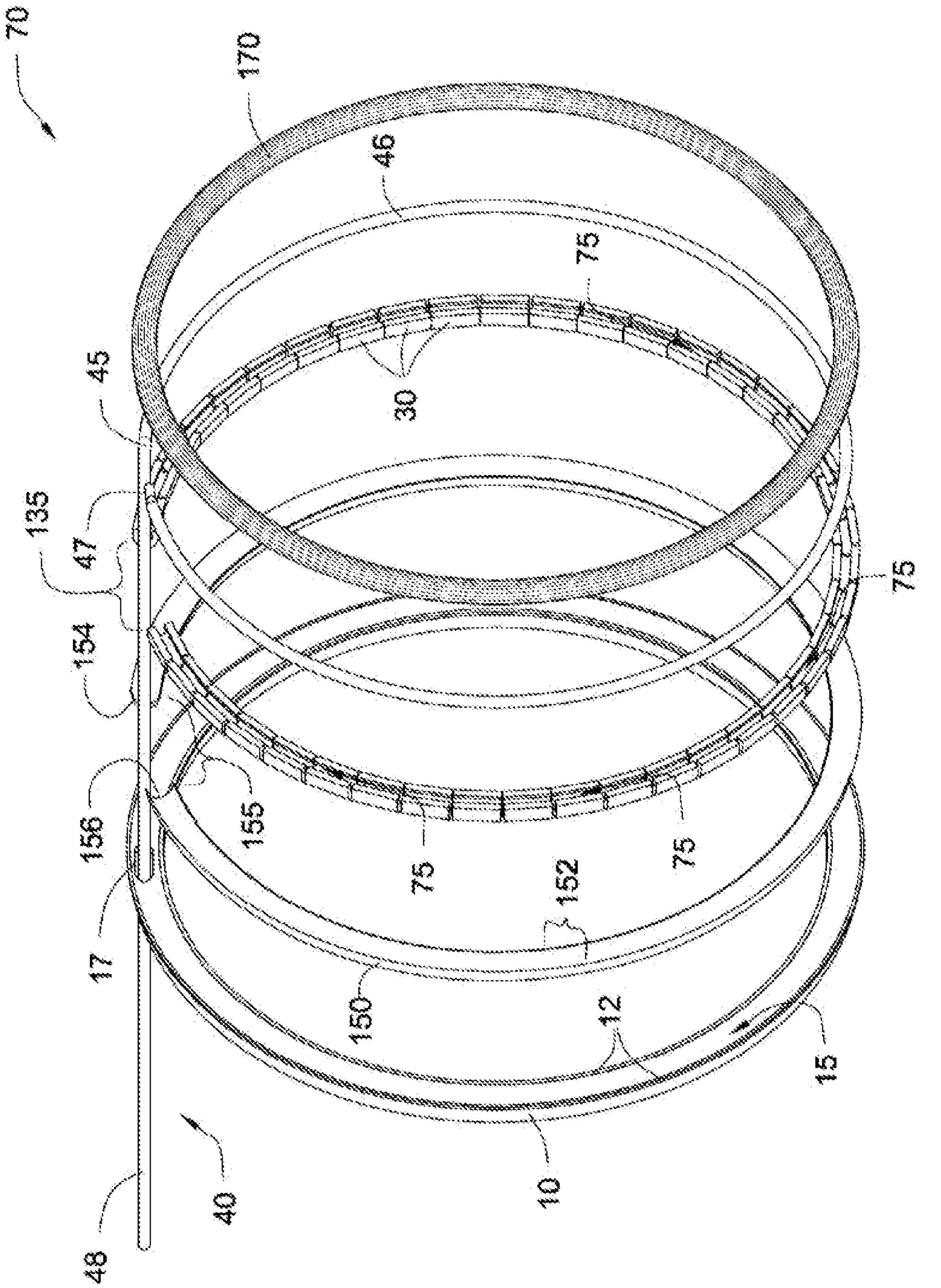
FIG. 14 is a diagram of data transmission coupler components.

Referring to (Prior Art) FIG. 14 (taken from FIG. 10 of the '003 reference) is an exploded view of the components used to produce the inductive coupler 70 and will be used to discuss the methods of assembling the same. The primary components, a generally U-shaped annular housing 10, a plurality of generally U-shaped magnetically conductive electrically insulating (MCEI) segments 30, and a conductor such as an insulated wire 40 are provided and form an assembly which will then be consolidated with a melted polymer. A generally U-shaped annular housing 10 forms the "backbone" of the inductive coupler. The annular housing 10 defines an opening 17 therethrough which communicates with the recess 15. In one embodiment a bridge (not shown) formed in a T-shape with a through hole can be placed in the opening 17. The bridge helps support the generally normal bend 45 in the insulated wire 40 when such a need is deemed appropriate.

Next, a meltable polymer liner 150 is placed in the recess 15. In a preferred embodiment the meltable polymer liner is generally U-shaped with an open end 152. A first end 154 and second end 156 of the annular liner 150 form a gap 155 adjacent the opening 17 through the annular housing 10. The MCEI segments 30 are arranged so as to provide a gap 135 therebetween adjacent the opening and placed on top of the annular liner so as not to interfere with the gap 155. Furthermore the MCEI segments are aligned to form a generally circular trough 75.

A conductor such as an insulated wire 40 comprises a first portion 46 and a second portion 48. The first portion 46 is generally normal at a bend 45 to the second portion 48. The conductor first portion 46 is placed within the circular trough 75 formed by the aligned MCEI segments 30 with the second portion 48 extending through the gap 155 and passing through the opening 17 of the annular housing 10. In the most preferred embodiment, the shape of the MCEI segments will require prior stringing of the MCEI segments 30 on the conductive loop 46 thus creating a sub-assembly. Such a shape is discussed above. In this situation, the MCEI segments 30, first portion 46, and second portion 48 are placed as a sub-assembly within the annular housing 10 and on top of the meltable polymer liner 150 in one step.

An end 47 of the first portion 46 is preferably electrically connected to the annular housing 10 forming an attachment. This is preferably accomplished by welding the housing and end together. Another method of attachment is brazing the end to the housing or even a combination of the two. Additionally, the means of electrically connecting the two may employ any method so long as it places the end in electrical communication with the annular housing.

Following the electrical connection step of the assembly process, a generally circular, meltable polymer cap 170 preferably with a protrusion (not shown) is placed adjacent the circular trough 75 formed by the plurality of MCEI segments 30 such that the protrusion fits within the trough and preferably rests on top of the insulated conductor. This feature will be shown in greater detail in subsequent drawings.

The assembly is then placed in a thermal press such as that depicted in FIG. 8 and heated to a sufficient temperature to at least partially melt the cap and liner together, thereby consolidating the inductive coupler. Preferably, the amount of polymer in the liner and cap, the heat and the pressure are all selected so as to ensure that all spaces between the segments, the annular housing and the conductor are filled with polymer upon cooling.

Figure 2:
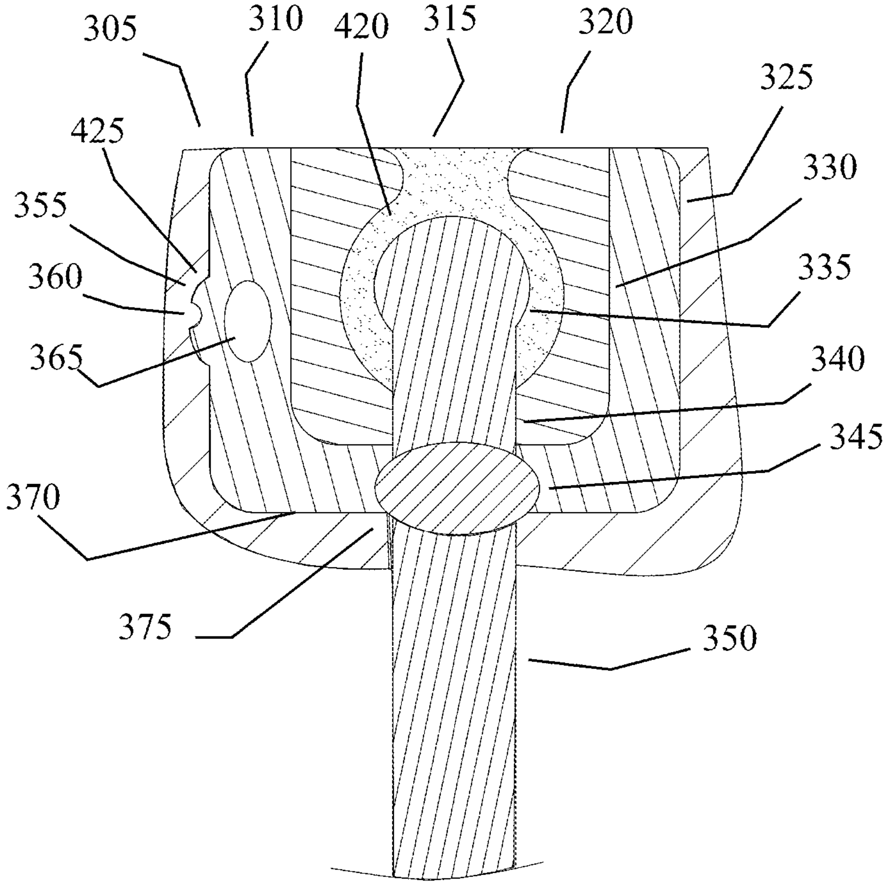
FIG. 2 is a diagram of a sectioned view of a data transmission coupler comprising a nonlinear coil.
Figure 3:
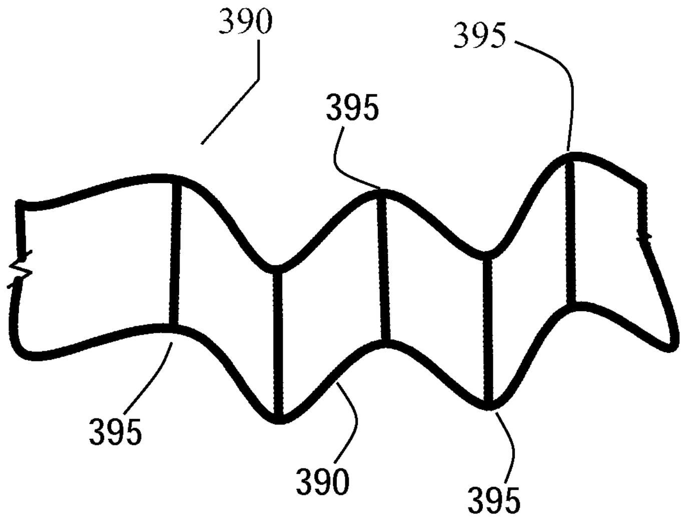
FIG. 3 is a diagram of a vertical wavy coil segment.
Figure 4:
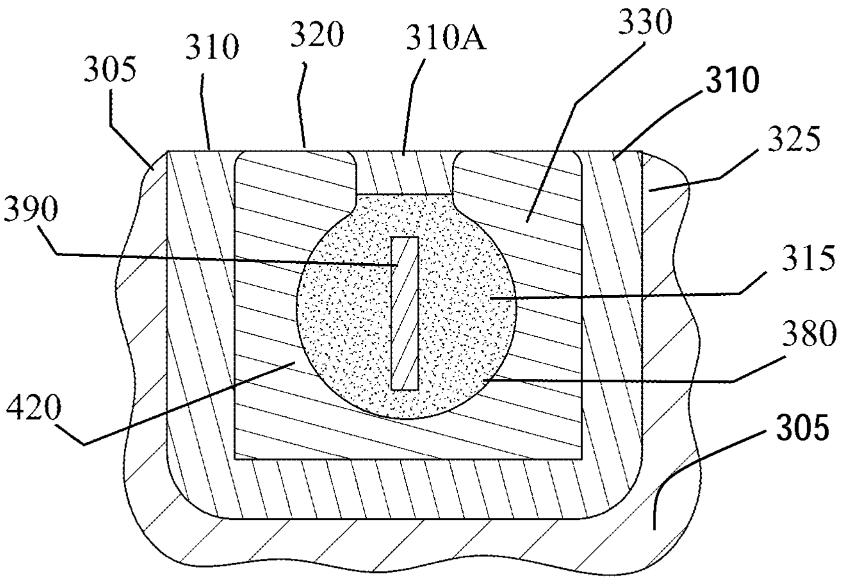
FIG. 4 is a diagram of sectioned view of a data transmission coupler comprising a wavy coil.
Figure 15:
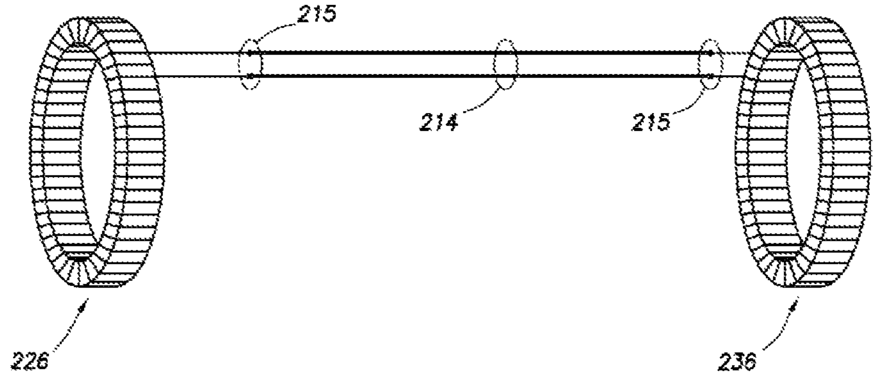
(Prior Art) FIG. 15
Figure 16:
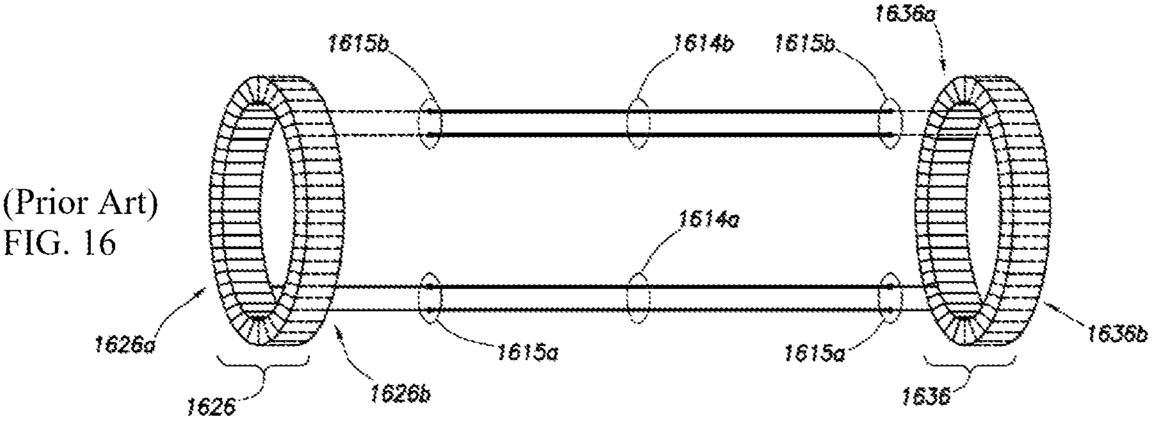
(Prior Art) FIG. 16

Referring to (Prior Art) FIGS. 15 and 16 (taken from FIGS. 16A and 16B of the '962 reference) FIG. 16A schematically illustrates a wired link according to the conduits (e.g., WDPs) of FIGS. 2-4. Thus, a pair of opposing toroidal transformers 226, 236 (components of respective communicative couplers) are interconnected by a cable 214 having a pair of insulated conducting wires that are routed within the tubular body of a conduit. Each toroidal transformer employs a core material having high magnetic permeability (e.g., Supermalloy), and is wrapped with N turns of insulated wire (N.about.100 to 200 turns). The insulated wire is uniformly coiled around the circumference of the toroidal core to form the transformer coils (not separately numbered). Four insulated soldered, welded or crimped connections or connectors 215 are utilized to join the wires of the cable 214 with the respective coils of the transformers 226, 236.

Reliability is critical for such WDP joints. If any wire in such a joint breaks, then the entire WDP system that employs the failing WDP joint also fails. There are several failure modes that might occur. For example, "cold solder joints" are not uncommon—where solder does not bond correctly to both wires. These can be intermittently open and then fail in the open condition. Prolonged vibration can cause wires to fatigue and break if they are not rigidly secured. Thermal expansion, shock, or debris might damage or cut the wire used to wrap the toroidal core.

FIG. 16B schematically illustrates a pair of independent wired links for employment by a conduit such as a WDP joint in accordance with the present invention. Thus, a pair of opposing toroidal transformers 1626, 1636 each includes a coil system having two independent coil windings, with each coil winding lying substantially within a 180.degree. arc of the coil system. More particularly, toroidal transformer 1626 has a first coil winding **1626*a* and a second coil winding 1626*b*, each of which is independently and uniformly coiled about half the circumference of the toroidal core of transformer 1626. Similarly, toroidal transformer 1636 has a first coil winding 1626*a* and a second coil winding 1626*b*, each of which is independently and uniformly coiled about half the circumference of the toroidal core of transformer 1636. A pair of insulated conducting wires, referred to as cable 1614*a*, extend between and are connected at respective ends thereof to the coil windings 1626*a*, 1626*a* by way of four insulated solder joints 1615*a*. Similarly, a pair of insulated conducting wires, referred to as cable 1614*b*, extend between and are connected at respective ends thereof to the coil windings 1626*b*, 1626*b* by way of four insulated solder joints 1615*b*. Cable 1614*a* is routed independently of cable 1614*b*** (meaning separate electrical pathways, but not necessarily remote routing locations within a WDP) so that the cables and their respective interconnected coil windings establish two independently-wired links.

It will be appreciated that WDP reliability can be improved by using a double wrap (or other multiple wrap) configuration as shown in FIG. 16B. In this design, there is a second, redundant circuit. Each toroidal core is wrapped with two separate coil windings (indicated by the dotted and dashed lines). In a particular embodiment, each winding has the same number of turns (M). However, the two wraps could have a different number of turns and still provide most of the benefits of redundancy. If M=N, then the electromagnetic properties of the new design are essentially the same as the previous design.

Because the two circuits are in parallel, if one circuit fails, the other circuit can still carry the telemetry signal. Furthermore, the characteristic impedance of the transmission line will not change significantly, so that such a failure will not increase the attenuation. The series resistance of the connecting wires will increase in this section of drill pipe if one circuit has failed, but the series resistance of the connecting wires does not dominate the transmission loss anyway. The leakage flux from the toroidal core will also increase slightly if one circuit fails, but this will have a minor effect as well. Because the cores' magnetic permeability is very large, most of the flux from the one winding will still remain in the core.

Referring to (Prior Art) FIGS. 17 and 18 (taken from FIGS. 2 and 4 of the '962 reference) WDP joint 210 is shown to have communicative couplers 221, 231—particularly inductive coupler elements—at or near the respective end 241 of box end 222 and the end 234 of pin end 232 thereof.

A first cable 214 extends through a conduit 213 to connect the communicative couplers, 221, 231 in a manner that is described further below.

The WDP joint 210 is equipped with an elongated tubular body 211 having an axial bore 212, a box end 222, a pin end 232, and a first cable 214 running from the box end 222 to the pin end 232. A first current-loop inductive coupler element 221 (e.g., a toroidal transformer) and a similar second current-loop inductive coupler element 231 are disposed at the box end 222 and the pin end 232, respectively. The first current-loop inductive coupler element 221, the second current-loop inductive coupler element 231, and the first cable 214 collectively provide a communicative conduit across the length of each WDP joint. An inductive coupler (or communicative connection) 220 at the coupled interface between two WDP joints is shown as being constituted by a first inductive coupler element 221 from WDP joint 210 and a second current-loop inductive coupler element 231' from the next tubular member, which may be another WDP joint. Those skilled in the art will recognize that, in some embodiments of the present invention, the inductive coupler elements may be replaced with other communicative couplers serving a similar communicative function, such as, e.g., direct electrical-contact connections of the sort disclosed in U.S. Pat. No. 4,126,848 by Denison.

FIG. 4 depicts the inductive coupler or communicative connection 220 of FIG. 3 in greater detail. Box end 222 includes internal threads 223 and an annular inner contacting shoulder 224 having a first slot 225, in which a first toroidal transformer 226 is disposed. The toroidal transformer 226 is connected to the cable 214. Similarly, pin-end 232' of an adjacent wired tubular member (e.g., another WDP joint) includes external threads 233' and an annular inner contacting pipe end 234' having a second slot 235', in which a second toroidal transformer 236' is disposed. The second toroidal transformer 236' is connected to a second cable 214' of the adjacent tubular member 9*a*. The slots 225 and 235' may be clad with a high-conductivity, low-permeability material (e.g., copper) to enhance the efficiency of the inductive coupling. When the box end 222 of one WDP joint is assembled with the pin end 232' of the adjacent tubular member (e.g., another WDP joint), a communicative connection is formed. FIG. 4 thus shows a cross section of a portion of the resulting interface, in which a facing pair of inductive coupler elements (i.e., toroidal transformers 226, 236') are locked together to form a communicative connection within an operative communication link. This cross-sectional view also shows that the closed toroidal paths 240 and 240' enclose the toroidal transformers 226 and 236', respectively, and that the conduits 213 and 213' form passages for internal electrical cables 214 and 214' that connect the two inductive coupler elements disposed at the two ends of each WDP joint.

The above-described inductive couplers incorporate an electric coupler made with a dual toroid. The dual-toroidal coupler uses inner shoulders of the pin and box ends as electrical contacts. The inner shoulders are brought into engagement under extreme pressure as the pin and box ends are made up, assuring electrical continuity between the pin and the box ends. Currents are induced in the metal of the connection by means of toroidal transformers placed in slots. At a given frequency (for example 100 kHz), these currents are confined to the surface of the slots by skin depth effects. The pin and the box ends constitute the secondary circuits of the respective transformers, and the two secondary circuits are connected back to back via the mating inner shoulder surfaces.

Figure 5:
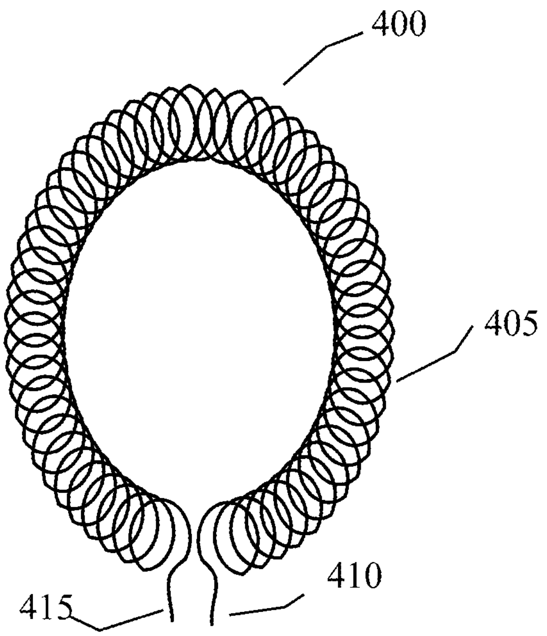
FIG. 5 is a perspective diagram of a nonlinear helix coil.

Referring to (Prior Art) FIGS. 19-21 (taken from FIGS. 5, 6, and 7 of the '177 reference). In FIGS. 5, 6, and 7 the fractional loops 67, 70 are half of a full loop. It is believed that the half loops have half the inductance that a full loop may have. It is believed that the fraction of inductance of a coil with fractional loops of equal distance may be determined in relation to a full loop coil by the following equation: L=1/n.sup.2., wherein L represents inductance and n is the number of fractional loops. According to the equation, a coil 45 comprising two half loops 67, 70 would have ¼ the inductance. A coil 45 with three equal fractional loops would have ⅑ the inductance. A coil 45 with four equal fractional loops 82, 83, 84, 85 (shown in FIG. 8) would have 1/16 the inductance. It is believed that the reduced inductance is made up in the reduced impedance reflections, which is believed to cause signal loss and attenuation.

The invention claimed is:

1. A transmission system, comprising:

an annular housing;

an annular U-shaped ferrite channel comprising an annular interior core region within the annular housing;

a vertical annular nonlinear electrically conductive rectangular shaped annular coil having opposed long sides connecting opposed distal and proximal short sides, the vertical annular nonlinear electrically conductive rectangular shaped annular coil disposed vertically circumferentially within the interior core region of the annular U-shaped ferrite channel, and wherein the opposed distal and proximal short sides of the vertical annular nonlinear electrically conductive rectangular shaped annular coil is connected to a cable running within a downhole tool.

2. The transmission system of claim 1, wherein the vertical annular nonlinear electrically conductive rectangular shaped annular coil comprises a wavy ribbon coil.

3. The transmission system of claim 2, wherein the vertical annular nonlinear electrically conductive rectangular shaped annular coil comprises the wavy ribbon coil comprising an average of between 1 and 5 waves per inch of a length of the vertical annular nonlinear electrically conductive rectangular shaped annular coil.

4. The transmission system of claim 1, wherein the vertical annular nonlinear electrically conductive rectangular shaped annular coil comprises a helix comprising vertical loops.

5. The transmission system of claim 4, wherein the vertical annular nonlinear electrically conductive rectangular shaped annular coil comprises the helix comprising an average of 2 to 27 vertical loops per inch of a length of the vertical annular nonlinear electrically conductive rectangular shaped annular coil.

6. The transmission system of claim 1, wherein the vertical annular nonlinear electrically conductive rectangular shaped annular coil comprises a wavy vertical strip.

7. The transmission system of claim 6, wherein the vertical annular nonlinear electrically conductive rectangular shaped annular coil comprises the wavy vertical strip comprising vertical corrugations along a length of the coil.

8. The transmission system of claim 1, wherein the annular housing comprises an annular polymeric block comprising a polymer selected from a group consisting of polyether ether ketone (PEEK), polytetrafluoroethylene (PTFE) (Teflon), polybenzimidazole (PBI), polyoxymethylene (Delrin), and Poly dicyclopentadiene (pDCPD).

9. The transmission of system claim 8, wherein the annular polymeric block comprises a gasket molded therein protruding from a bottom side surface of the annular polymeric block.

10. The transmission system of claim 1, wherein the annular housing comprises an annular polymeric block comprising a volume of Fe and Mn particles averaging between 10% and 65% of a volume of polymer.

11. The transmission system of claim 1, wherein the annular housing comprises an annular polymeric block comprising a volume of Fe and Mn particles ranging in average diameter between 10 nm and 3 mm.

12. The transmission system of claim 1, wherein the annular housing comprises an annular polymeric block comprising a bumper protruding from a periphery of the annular housing.

13. The transmission system of claim 1, wherein the annular housing comprises an annular polymeric block comprising at least one void opening.

14. The transmission system of claim 1, wherein the annular ferrite channel comprises ferrite segments.

15. The transmission system of claim 14, wherein the annular ferrite channel comprises one or more of the ferrite segments comprising openings for a passage of at least one end of the vertical annular nonlinear electrically conductive rectangular shaped annular coil.

16. The transmission system of claim 1, wherein the annular ferrite channel comprises a twisted pair of wires.

17. The transmission system of claim 1, wherein the annular ferrite channel comprises an annular metal trough.

18. The transmission system of claim 1, wherein the annular ferrite channel comprises an annular nonmetal trough.

19. The transmission system of claim 1, wherein the annular housing comprises an annular groove in the downhole tool.

20. The transmission system of claim 1, wherein the annular housing comprises a hardened annular groove in the downhole tool.

* * * * *